(12) United States Patent
Kiyomatsu et al.

(10) Patent No.: US 6,952,598 B2
(45) Date of Patent: Oct. 4, 2005

(54) VIRTUAL IMAGE DISPLAY APPARATUS AND ELECTRONIC EQUIPMENT USING THEREOF

(75) Inventors: Satoshi Kiyomatsu, Kasuga (JP); Kazumi Ohtsubo, Kurume (JP); Kazuyuki Nakashima, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 773 days.

(21) Appl. No.: 09/810,462

(22) Filed: Mar. 19, 2001

(65) Prior Publication Data

US 2001/0027125 A1 Oct. 4, 2001

(30) Foreign Application Priority Data

Mar. 22, 2000 (JP) ........................................ 2000-079762

(51) Int. Cl.[7] .............................. H04B 1/38; H04M 1/00
(52) U.S. Cl. ...................... 455/566; 455/90.3; 455/344; 345/7; 353/33
(58) Field of Search ................................ 455/566, 90.1, 455/90.3, 344–351, 556, 550.1, 569.1, 575.1, 575.2, 575.6; 345/7; 353/33

(56) References Cited

U.S. PATENT DOCUMENTS

| | | | | |
|---|---|---|---|---|
| 4,048,653 A | * | 9/1977 | Spooner | 348/115 |
| 5,048,077 A | | 9/1991 | Wells et al. | |
| 5,224,198 A | | 6/1993 | Jachimowicz et al. | |
| 5,583,795 A | * | 12/1996 | Smyth | 702/150 |
| 5,696,521 A | * | 12/1997 | Robinson et al. | 345/8 |
| 5,712,649 A | * | 1/1998 | Tosaki | 345/8 |
| 5,867,795 A | * | 2/1999 | Novis et al. | 455/566 |
| 5,933,279 A | * | 8/1999 | Yamazaki | 359/630 |
| 5,991,103 A | * | 11/1999 | Togino | 359/834 |
| 6,081,304 A | * | 6/2000 | Kuriyama et al. | 348/838 |
| 6,417,969 B1 | * | 7/2002 | DeLuca et al. | 359/630 |

* cited by examiner

Primary Examiner—Charles Craver
(74) Attorney, Agent, or Firm—Stevens, Davis, Miller & Mosher, LLP

(57) ABSTRACT

There is provided a small-sized and light-weight image display apparatus which is thinned in the line of sight and which incorporates a display unit for displaying a magnified virtual image and a direct image, the display apparatus comprising a real image display part for displaying an image, an image magnifying means for optically magnifying the image formed in the real image forming means so as to form a virtual image, and a light guide means for guiding light from the real image display part to the image magnifying means, the magnifying means being formed in a triangular columnar shape having a substantially isosceles triangular cross-section, and having a first surface serving a light incident surface, a light emanating surface and a reflective surface, and a first internal reflecting surface and a second internal reflecting surface for reflecting light into the light guide means, wherein emanating light from the real image display part is incident upon the light guide means through the first surface, and is then reflected by the first internal reflection surface and the second internal reflection surface, and thereafter, the light emanating from the light guide means and entering into the image magnifying means.

26 Claims, 28 Drawing Sheets

VIRTUAL IMAGE DISPLAY APPARATUS AND ELECTRONIC EQUIPMENT USING THEREOF

BACKGROUND OF THE INVENTION

1. Field of the Invention

The present invention relates to a virtual image display apparatus having a function of display of a magnified virtual image, for visually magnifying and displaying an image to be monitored, and also relates to an electronic equipment using thereof.

2. Description of Related Art

These years, various information processing equipments, and in particular, equipments which can process visual information by means of liquid crystal or photoelectric image display means or the like, have been astonishingly progressed. The so-called mobile equipments, that is, data processing machines which can be personally used at any of various places, have also remarkably developed. The mobile equipments are desirable so as to have a compact body for portability, a high speed of data processing, several processing functions, and as well to have a means for precisely and straightforward displaying much more information to the user within a limited space of a small-sized equipment. Display means which utilizes liquid crystal or the like and which occupies a substantial part of the operating surface of an equipment has been prosperously used as such an image displaying means, but it can hardly have a possibility of follow-up of miniaturization of the equipment.

Accordingly, in order to effectively solve the above-mentioned problems, for example, virtual image magnifying and displaying units including head-mounting displays and finder (check) displays have been become noticeable, and accordingly, various studies and the development of associated equipments have been made until now.

The virtual image magnifying and displaying device is configured such that a single lens or a combination of a plurality of lenses is used so as to project a virtual image which is magnified by a positive refractive power, in the visual field. The structure thereof is simple, and has been prosperously used in general for optical systems having a relative small viewing angle. For example, it is used in a monitoring finder optical system for setting the photographing range (viewing angle) and confirming the focusing, among many video camera recorders. However, it has been raised such a problem that the structure becomes larger in the direction of the optical axis of the optical system.

In an example of another arrangement using a half-mirror, the brightness of a virtual image is lowered, and accordingly, the virtual image displaying apparatus exhibits a very dark virtual image to the eyes of the user, that is, the visibility of the virtual image is low. Further, the higher the brightness of the image, the larger the power for the illumination, the power consumption is increased, and accordingly, the virtual image display unit becomes unsuitable for portable data terminals.

SUMMARY OF THE INVENTION

The present invention is devised in order to solve the above-mentioned problems, and accordingly, an object of the present invention is to provide a display apparatus which is small-sized, and which can monitor external environments in addition to data to be displayed, and as well to provide an electronic equipment incorporating thereof.

According to the present invention, there is provided a virtual image display apparatus comprising a real image display part for displaying an image, an image magnifying means for magnifying the image created by the real image display part so as to obtain a virtual image, and a light guide means for guiding light from the real image display part to the image magnifying means, the light guide means being formed in a triangular prism shape having an isosceles triangular cross-sectional shape so as to have a first surface serving as a light incident surface, a light emanating surface and a reflecting surface, and a first inner reflecting surface and a second inner reflecting surface for reflecting light into the light guide means, wherein light emanating from the real image display part enters into the light guide means from the first surface, and after being reflected at the first and second inner reflecting surfaces, it emanates toward the image magnifying means. Further, according to the present invention, there is provided an electronic equipment incorporating the above-mentioned virtual image display apparatus.

DESCRIPTION OF THE PREFERRED EMBODIMENTS:

(First Embodiment)

Explanation will be hereinbelow made of a first embodiment of the present invention with reference to the drawings. In this embodiment, a portable data terminal having a communication function is exemplified as an electronic equipment.

Figure 1:
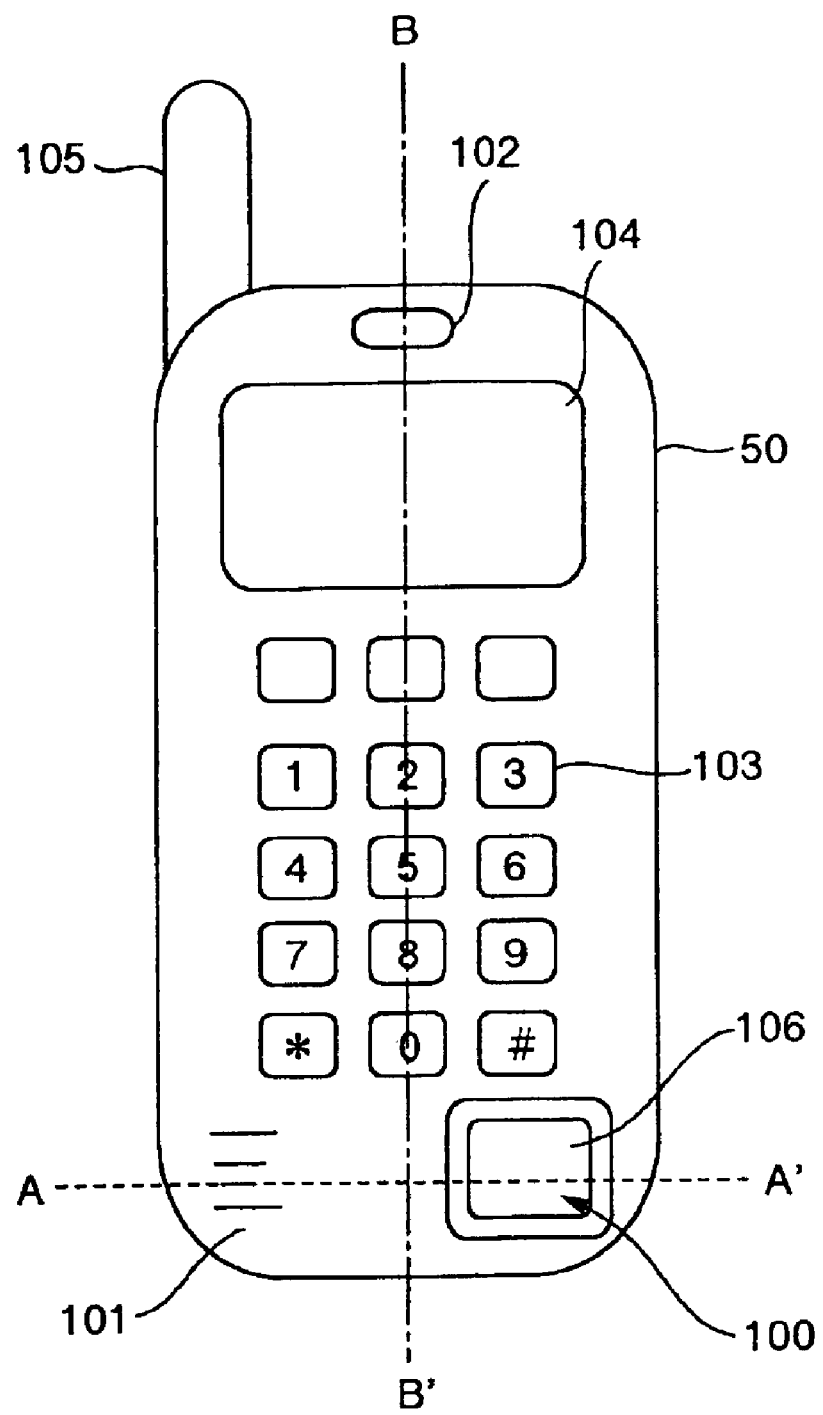
FIG. 1 is a front view illustrating a portable data terminal which is mounted thereon with a virtual image display in an embodiment of the present invention.
Figure 2:
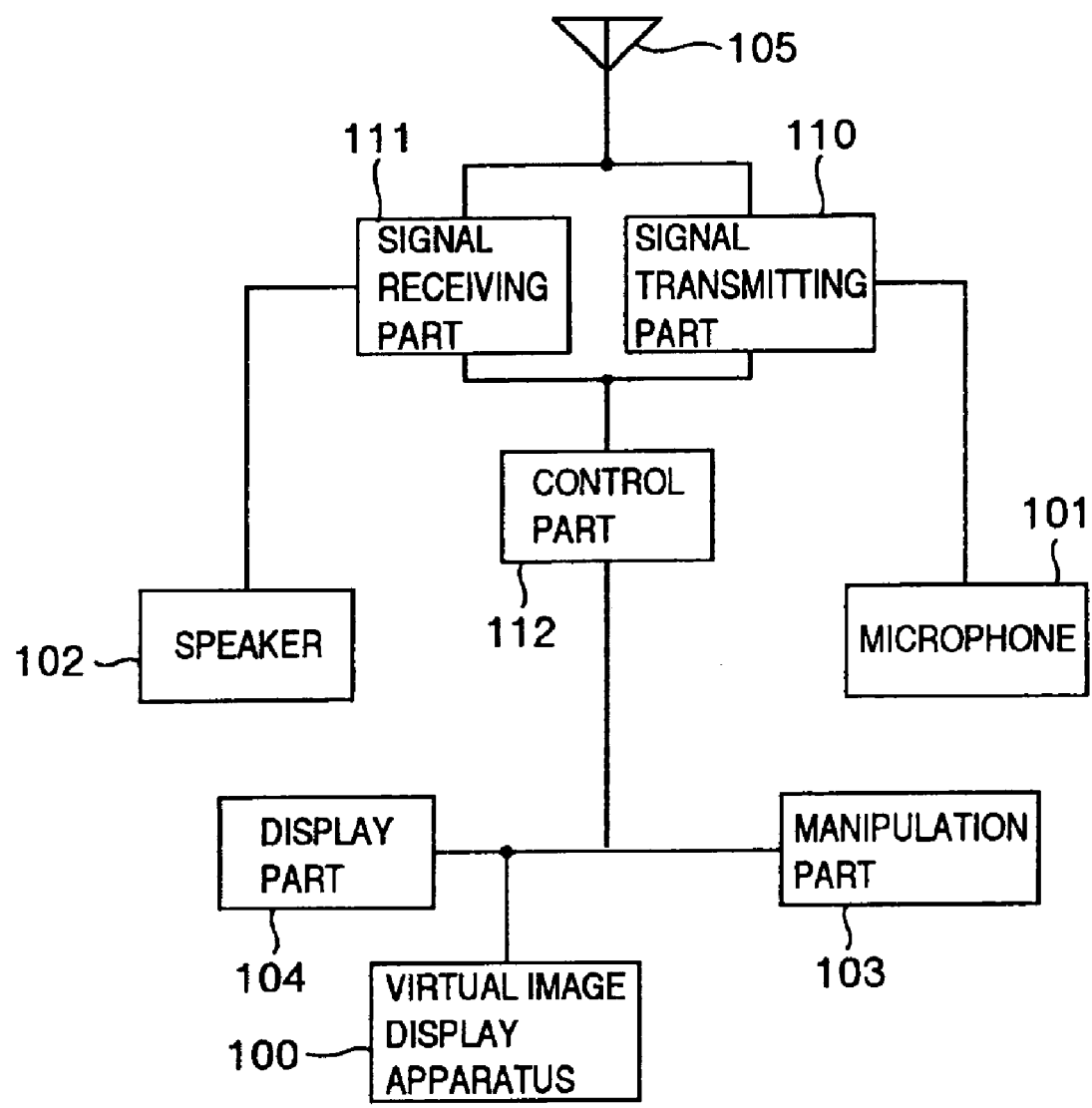
FIG. 2 is a control block diagram illustrating the portable data terminal in the embodiment of the present invention.
Figure 3:
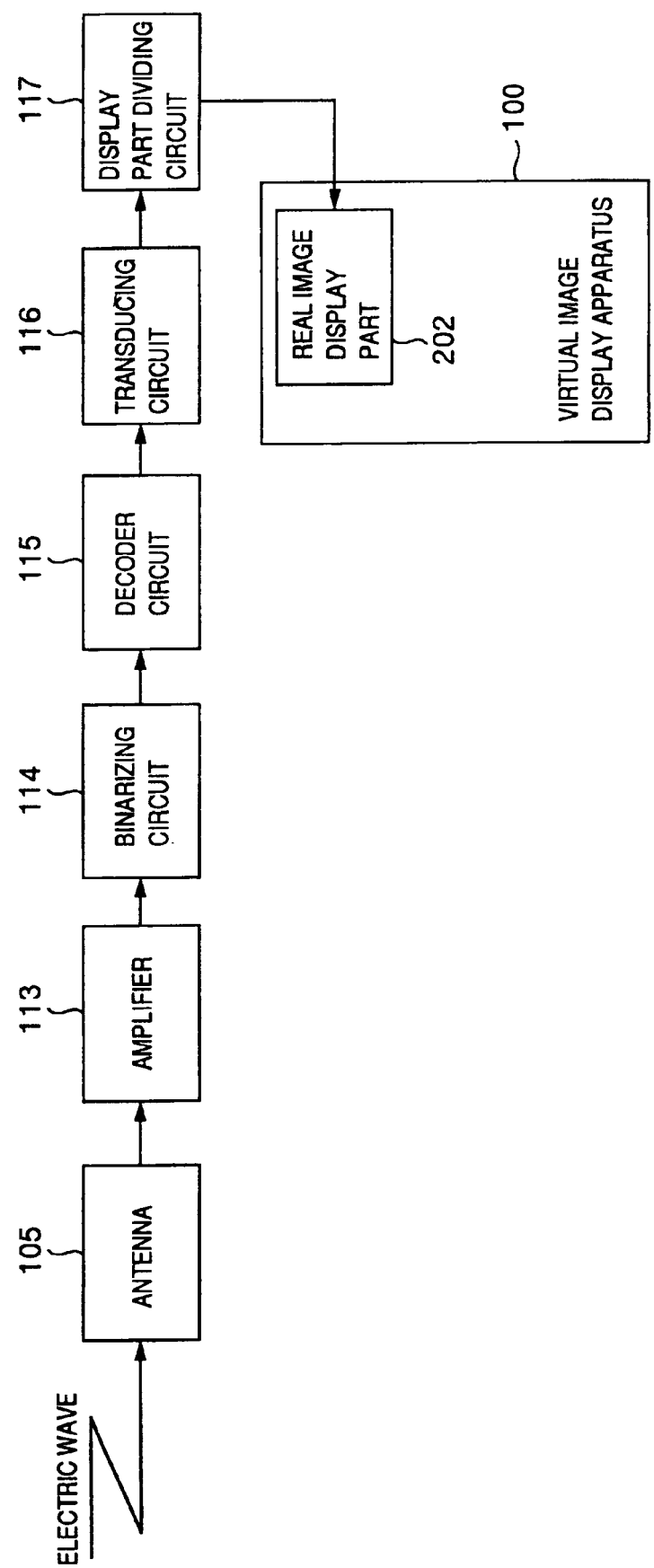
FIG. 3 is a control block diagram illustrating image display of the portable data terminal in the embodiment of the present invention.

FIG. 1 is a front view illustrating a portable data terminal which is mounted thereon with a virtual image display apparatus in the first embodiment of the present invention, and FIG. 2 is a sectional view along line A–A' in FIG. 1. Further, FIG. 3 is a control block diagram illustrating a portable data terminal control block diagram in the first embodiment of the present invention.

Referring to FIG. 1, there are shown the virtual image display apparatus 100 which is accommodated in a housing 50 of the portable data terminal and which will be detailed later, a microphone 101 for transducing voice into voice signals, a speaker 102 for transducing a voice signal into voice, a manipulation part 103 composed of dial buttons and the like, a display part 104 composed of a liquid crystal display unit and having a surface illumination unit located underneath thereof, for displaying character data having a relatively low degree of resolution (equal to or less than about 50×120), which are simple characters such as a telephone number, a name of a counter party or the like obtained from received data, transmission data, retrieval data or the like, an antenna 105 for transmitting and receiving signals, and a display window 106 through which an image from the virtual image display apparatus 100 is observed. When the user peeps into the display window 106 from a position having a predetermined distance from the display window 106, a magnified virtual image having a relatively high degree of resolution (equal to or higher than about 320×480) can be observed.

It is preferable to arrange the display window 106 so as to locate the center of the display window 106 at a position deviated from the longitudinal center line of the housing 50 of the portable data terminal. With this arrangement, an image can be observed from the display window 106 even though the portable data terminal is not largely tilted, and accordingly, the image visibility of the portable data terminal becomes satisfactory.

Further, as to the positional relationship between the display window 106 and the microphone 101, they are located on both sides of the longitudinal center line B–B' of the housing 50 of the portable data terminal. With this arrangement, when the communication is made by means of the microphone 101 while observing the display window 106, the distance between the microphone 101 and the mouth of the user can be reduced, and accordingly, a convenient portable data terminal can be provided with satisfactory image visibility and speech quality. It is noted that the display window 106 can be provided either on the image display apparatus 100 side, or on the housing side. Further, it can be provided on both sides.

Further, the positioning direction (direction of the line A–A') of the virtual image display apparatus 100 which is defined by a straight line connecting between the centers of the real image display part and the display window 106 of the virtual image display apparatus 100 accommodated in the portable data terminal, and the longitudinal direction (direction of the line B–B') of the portable data terminal are not parallel with each other, and it is preferable that they are arranged so as to substantially perpendicular to each other in order that the longitudinal length of the portable data terminal can be reduced so as to use the portable data terminal such as to observe an image while hearing voice message.

Since the virtual image display apparatus 100 is accommodated in the housing 50 as mentioned above, it is possible to prevent the virtual image display image apparatus 100 from being directly touched by the user so as to be broken or to cause deterioration of its optical characteristics. Further, it is possible to prevent dust or the like from entering the virtual image display apparatus and sticking to the light guide member or the like so as to deteriorate the optical characteristic of the virtual image display apparatus. Further, with the provision of the display window 106, it is possible to restraining stray light entering therearound from being incident the eyes of the user, thereby it is possible to provide an electronic equipment having excellent visibility.

Further, with the provision of the virtual image display apparatus 100 in addition to the provision of the display window 104, a place where data is displayed can be optional in accordance a purpose of the data. That is, communication address data can be displayed on the display part 104 but detailed image data such as map data or electronic mail sent by the other party, which should be displayed by being magnified, can be observed through the virtual image display apparatus 100.

Incidentally, how-to determine which of the display part 104 and the virtual image display apparatus data should be displayed is dependent upon the size of a file of the data, and may be directly made by the electronic equipment, or may be selected at the discretion of the user. In this case, a display selecting button is preferably provided in the manipulation part 103 in view of convenience in use of the electronic equipment. Further, it may be designed that data upon signal transmission is displayed on the display part 10 while data upon signal receiving is displayed on the virtual image display apparatus 100.

Next, explanation will be made of the operation of the portable data terminal having the above-mentioned arrangement. Referring to FIG. 2 which is a control block diagram illustrating the portable data terminal in the embodiment of the present invention. When data is received, a receiving signal is delivered from a receiving part 111 to a control part 112 which displays predetermined characters or the like on either the display part 104 or the virtual image display apparatus 100 in dependence upon the receiving signal, and then, when a button or the like for instructing to receive the data is depressed in the manipulation part 103, a signal is delivered to the control part 112 which therefore sets a signal receiving mode to respective parts. That is, a signal received through the antenna 105, is transduced into a voice signal in the receiving part 111, and voice corresponding to the voice signal is issued from the speaker 101. Meanwhile, voice inputted through the microphone 101 is transduced into a voice signal which is then transmitted outside by the transmission part 110 through the antenna 105.

Next, explanation will be made of the transmission of data. Upon the transmission, a signal for instructing to transmit data is delivered from the manipulation part 103 to the control part 112. Then, when a signal corresponding to a telephone number, an internet protocol (which will be hereinbelow denoted being abbreviated as "IP") or the like is delivered from the manipulation part 103 to the antenna 105, the control part 112 causes the transmission part 110 to transmit a signal corresponding to the telephone number, the IP or the like from the antenna 105. The signal inputted at this time is usually displayed on the display part 104 through illumination of the planar illumination device. After the communication with the third party is established, when a signal indicating this condition is transmitted to the control part 112 through the antenna 105 and the receiving part 111, the control part 112 sets up a transmission mode at respective parts. That is, the signal received through the antenna 105 is transduced into a voice signal in the receiving part 111, and accordingly, voice is issued from the speaker 102, corresponding to the voice signal while voice inputted through the microphone 101 is transduced into a voice signal which is then transmitted outside from the antenna 105 by the transmission part 101.

Next, explanation will be in particular made of an example of the displaying operation of a magnified virtual image on the display window 106 with reference to the drawings. Referring to FIG. 3 which is a control block diagram illustrating the display of an image on the portable data terminal, data received through the antenna 105 is amplified by an amplifying part 113 into an amplified signal which is then delivered to a binarizing circuit part 114. The amplified signal is subjected to A/D conversion in the binarizing circuit part 114 so as to obtain a binarized signal which is then delivered to a decoder circuit part 115 for decoding the binarized signal if the binarized signal has been compressed or coded, before the signal is delivered to a conversion circuit part 116, but directly delivers the binarized signal to the same if it is not coded. Thereafter, the decoded signal or the binarized signal delivered to the conversion circuit part 116 is converted into a drive signal which is adaptable for a display part drive circuit part 117, and is delivered to the latter. Then, the display part drive circuit part 117 displays an image in a real image display part 202 in the virtual image display apparatus 100 in response to the drive signal.

Next, explanation will be made of the configuration of the virtual image display apparatus 100 with reference to FIG. 4 which is an enlarged sectional view along line A–A' in FIG. 1, illustrating the virtual image display apparatus 100 in an embodiment of the present invention. In this embodiment, the virtual image display apparatus.100 incorporated in the housing 50 of the portable data terminal is mainly composed of an image forming module 200, a light guide part 300 and a light condensing part 400. Explanation will be hereinbelow made of them, respectively.

At first, the image forming module 200 incorporates a backlight device 201 and a real image display part 202 which are attached by means of a common housing 203.

The backlight device 201 is applied therewith a power from a backlight power source 205 and is adapted to illuminate the real image display part 202, and accordingly, it is preferable to uniformly illuminate the real image display part 202 in its entirety with brightness higher than a predetermined value. As to the power source for such a backlight device, there may be preferably used a light emitting device using light emitting diodes (LED), electroluminescence (EL), thin flourescent lamps or the like, since it can offer high and uniform bright illumination.

The real image display part 202 is formed of liquid crystal since it can ensure sufficient brightness and can restrain occurrence of stray light. Further, the real image display part 202 controls the voltage applied to the liquid crystal for each cell therein, so as to change the volume of transmission light from the backlight source 201 in accordance with an image data signal from the image processing circuit 204 (corresponding to the display part drive circuit part 117). With this arrangement, diffusion light emitted from the backlight device 201 is incident upon and transmits through the real image display part 202 so as to create a bundle of light rays containing image data, which is then emitted from the image forming module 200.

It is noted that the degree of resolution of the real image display part 202 is higher than at least 320×480, and preferably higher than 800×600 in order to satisfy the display capacity required for the portable data terminal, thereby it is possible to substantially eliminate erroneous recognition of an electronic male, image data or the like. By setting the size of the real image display part 202 to be smaller than at least 1 inch, and preferably smaller than 0.5 inch, the virtual image display apparatus 100 incorporated in the portable data terminal can be small-sized, thereby it is possible to display an apparently large image with high definition. Thus, the virtual image display apparatus 100 can be simply incorporated in an electronic equipment such as a portable data terminal while restraining the electronic equipment from being large-sized. Further, since the enlarged virtual image apparently has a size which is larger than 24 inch, and preferably larger than 28 inch at a position in front of the virtual image display apparatus 100 by a distance of 2 mm, thereby it is possible to provide a virtual image display apparatus which is excellent in visibility and which can prevent erroneous recognition or overlooking.

It is preferable to set the distance between the light emanating surface of the backlight device and the incident surface of the real image display part 202 to be longer than 0.1 mm but less than 10 mm since light can be largely diffused and since the volume of light incident upon the real light guide member 300 can be relatively increased. It is noted that a light condensing plate, a diffusion plate or the like may be interposed between the backlight device 201 and the real image display part 202 in view of an arrangement of the electronic components or the like (which is not shown) or in view of a safety against heat or the like if a certain distance is more or less required between the backlight device 201 and the real image display part 202.

The backlight device 201 and the real image display part 202 are incorporated in a housing 203 which is in turn mounted to the housing 50 of the portable data terminal. This housing 203 is preferably made of a metal or resin material which is optically low transmissive, and which has a sufficient thickness and a high degree of hardness so that it can hardly transmit therethrough incident light. As to such a metal material, aluminum, magnesium, brass or the like, and as well metal and alloy having a high strength and a high degree of hardness corresponding to these materials. Alternatively, ABS polystyrol or synthetic resin having a high strength and a high degree of hardness substantially equal to those of the former materials may be used. In particular, with the use of the above-mentioned metal or alloy, the heat generated in the image forming module 200 can be efficiently transmitted and radiated, thereby it is possible to restrain overheat of the image forming module 200. Further, with the use of the resin material, it is possible to aim at reducing the weight of the virtual image display apparatus 100 so as to optimize a portable electronic equipment such as a portable data terminal which is commercially required to be small-sized.

It is preferable to provide such a configuration that the space between the backlight device 201 and the real image display part 200 incorporated in the housing 203 is surrounded by the housing 203 so as to cause light emitted from the backlight source to enter the real image part 200 by a substantially all part thereof since the stray light can be restrained from emitting from the backlight device 201.

Further, it is preferable to incorporate the backlight device 201 and the real image display part 202 in the housing 203 in such a condition that they are mounted to the housing 203, since complicated works including the alignment between the backlight device 201 and the real image display part 202 and like can be carried out at separate process steps. Thus, it is possible to enhance the productivity of portable data terminals.

It is noted that although the housing 203 is provided, saperate from the housing 50 of the portable data terminal in the above-mentioned embodiment, the backlight device 201 and the real image display part 202 may be directly incorporated in the housing 50 with no provision of the housing 203, and alternatively, the backlight device 201 may be incorporated in the housing 50 while the real image display part 202 may be incorporated in the housing 203.

It is noted that a self-emission type display device which does not require the backlight device 201 may be used as the real image display part 202 although liquid crystal is used as the real image display part 202 in this embodiment. As to such a self-emission type display device, there may be used an organic EL, an LED panel, a field emission display device and the like. With the use of these display device, the necessity of the backlike device 201 can be eliminated, and the structure of the image forming module 200 can be simplified while uniform brightness distribution having a high degree of brightness can be obtained, thereby it is possible to reduce both heat radiation and power consumption. Further, thereby it is possible to aim at reducing the size and the thickness of the portable data terminal.

Figure 4:
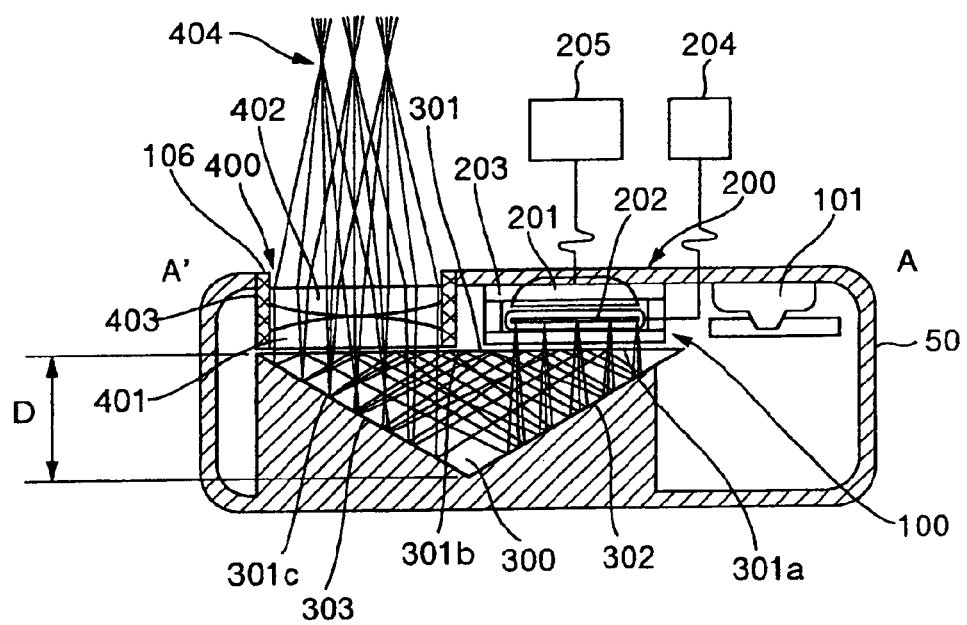
FIG. 4 is a sectional view along line A–A' in FIG. 1.

Further, although FIG. 4 shows, for the sake of convenience, the image processing circuit 204 and the backlight power source 205 which are both provided outside of the housing 50, both image processing apparatus 204 and the backlight power source 205 should be actually accommodated in the housing 50 or the housing 203.

Next, explanation will be made of the light guide member 300. In the configuration of this embodiment, the light guide member 300 is formed of an optical prism in the form of a triangular columnar shape having a substantially isosceles triangular cross-sectional shape. The light guide member 300 has a first surface 301 which is substantially planar, and which serves as a light incident surface, a light emanating surface, or a reflecting surface, a first internal reflecting surface 302 which is substantially planar, and which is covered with a high reflective multi-layer film having a high reflectance rate of higher than at least 90% and made of metal such as silver or aluminum or a multiplayer dielectric material in order to enhance the reflectivity, and a second internal reflecting surface 303 which is covered with a high reflective multi-layer film having a high reflectance rate of higher than at least 90% and made of metal such as silver or aluminum or a multiplayer dielectric material in order to enahne the reflectivity.

The light guide member 300 is preferably made of a resin material or a glass material having a refractive index of 1.3 to 1.6 and having a light transmittance rate of higher than 93% so as to enhance the total reflection of the surface of the light guide member 300 which abuts on the air and to minimize optical loss across the light guide member 30, since it is possible to enhance the light efficiency, and as well to transmit a bright image.

With this arrangement in which the light guide member 300 is formed of an optical prism having a triangular columnar shape so as to be small-sized and thinned, thevirtual image display apparatus can be small-sized and thinned. Further, due to the triangular columnar shape, the optical prism has three side surfaces used as reflecting surfaces which can be therefore simply formed, and light can be guided through the light guide member 300 in its entirety, thereby it is possible to enhance the special efficiency in the light guide member 300.

Incidentally, as to the sectional shape of the light guide member, it may take such an arrangement that the end part in which the second internal reflection surface 303 is formed is greater (longer) than the end part in which the first internal reflection surface 302 is formed, in view of the diversion of light. With this arrangement, the efficiency of the use of light can be enhanced.

The bundle of right rays emitted from the image forming module 200 and having image data, after entering the inside of the light guide member 300 from the incident part 301a of the first surface 301 of the light guide member 300, is incident by its substantial part thereof upon the first internal reflection surface 302 so as to be reflected thereby. Further, the bundle of light rays reflected thereby is reflected by a reflecting part 301b which is present in the same plane as that of the incident part 301a and which is substantially planar. Since the reflection upon the reflecting part 301b is a total reference ruled by the Snell's Law, no film coating such as a metal or dielectric multilayer film as mentioned above which enhances the reflectance is required, and further, no process for attaining the object of enhancing the reflectance is required. With this arrangement which does not require the formation of a reflecting film on the reflecting part 301b, since the light from the first internal surface can be reflected without substantially decreasing the quantity of the light entering the light guide member 300 from the image forming module 200, and the quantity of the light emanating the light guide member 300 and entering into the light condensing member 400, the efficiency of the use of light can be enhanced, and since the quantity of light emitted from the backlight device 201 can be restrained from increasing, the power consumption of the image forming module 200 can be lowered.

The bundle of light rays reflected by the reflecting part 301b in the first surface 301 reaches the second internal reflecting surface 303 which is a substantially planar surface or an arbitrarily curved surface, and after being reflected by the second internal surface 303, is then emanated outside from the light guide member 300 through the light emanating part 301c in the first surface 301. That is, the bundle of light rays repeats internal reflection by three times within the light guide member 300.

As mentioned above, by guiding the light through the light guide member 300, the length by which the bundle of light rays passes through the air can be decreased, it is possible to minimize deterioration of the optical characteristics of the virtual image display apparatus 100 due to reflection and scatter of the bundle of light rays caused by dust or the like in the air. By setting the number of repetitions of reflection of light in the light guide member 300 to a value more than three, the optical path length can be taken to be longer while the virtual image display apparatus 100 can be small-sized or in particular the thickness thereof in the direction of the line of sight (in the direction of peeing by the user) can be decreased. Accordingly, the size of a virtual image can be apparently increased with the use of a structure having a less size. Thereby it is possible to provide a virtual image display apparatus which is small-sized and which has high visibility.

Further, since the first surface 301 having a widest area in the light guide member 300 is used as the incident part 301a, the reflecting part 301 and the emanating part 301c, the structure of the light guide member 300 can be simplified, and the number of surfaces from which light emanates and enters into can becomes smaller while the working of mirror surface finishing by which the surface roughness is reduced or scratching on the surface is removed, can be reduced. Thereby, it is possible to enhance the productivity of the virtual image display apparatus and to reduce the cost thereof.

It is noted that the light guide member 300 may be formed in such a way as to define a space in stead of the optical prism while locating reflecting members, respectively at the positions where the reflecting part 301b, the internal reflecting surfaces 302 and 303 are arranged, although the optical prism is used as the light guide member 300 in this embodiment.

Further, in this embodiment, although the optical prism constituting light guide member 300 has a triangular columnar shape having an isosceles triangular cross-sectional shape, this optical prism should not be limited to this shape, but it may has any other columnar shape such as a square columnar shape, a pentagonal columnar shape or an elliptic columnar shape, and as well it may have a shape other than a columnar shape. Further the number of times of internal reflection should not be limited to three, and although the incident surface and the emanating surface are formed in the one and the same plane in this embodiment, they may be formed in different planes, respectively.

Further, the first internal surfaces 302 and the second internal surface 303 may be formed as being convex outward of the light guide member 300 so as to have a light condensing function as necessary, or may be formed as being convex inward of the light guide member 300 so as to have a light diffusing function.

Further, they may be formed so as to have both functions in combination. With this arrangement in which the shapes of the first internal reflecting surface 302 and the second internal reflecting surfaces 303 are formed to be nonplanar, the freedom of light guiding can be enhanced. Thus, it is possible to provide a virtual image display apparatus while the lowering of the efficiency of the use of light is minimized, thereby it is possible to enable a portable data terminal incorporating the virtual image display apparatus to be small-sized and thinned.

Next, explanation will be made of the positional relationship between the image forming module 200 and the light guide member 300. It is configured that the angle between the real image display part 200 of the image forming module 200 and the incident part 301a of light guide member 300 is smaller than 10 deg., or preferably, they are substantially in parallel with each other. With this configuration, the center axis of light emanating from the real image display part 202 makes an angle of 80 deg. or is preferably and substantially perpendicular to the incident part 301a, and accordingly, light which is emitted from the image creating part 202 and which is incident upon the incident part 301a is not substantially reflected by the surface of the incident part 301a so that the light from the real image display part 202 can be introduced by a substantial part thereof into the light guide member 300. Thus, the efficiency of the use of light is high, thereby it is possible to restrain power consumption for ensuring the light quantity, from being increased.

Further, the image forming module 200 and the light guide member 300 are provided being distant from each other. With this arrangement, it is possible to restrain deterioration of the optical characteristics due to expansion or contraction of the light guide member 300 and deformation of the surface of the incident part 301a through affection by heat generated in the image forming module 200, thereby it is possible to always provide a virtual image display apparatus having excellent visibility. Further, it is possible to efficiently effect the total reflection upon the reflecting part 301b of the light guide member 300, and accordingly, it is possible to enhance the efficiency of the use of light. It is noted the distance between the image forming module 200 and the light guide member 300 spaced from each other is set to be in a range from 0.1 μm to 5 mm (which is longer than the wavelength of light to be used) in order to ensure the total reflection at the reflecting part 301b and to enable the virtual image display apparatus 100 to be small-sized while avoiding the problem of heat or the like. In particular, it is preferably set to be less than 1 mm so as to minimize the diversion of light between the image forming module 200 and the light guide member 300 so as to block the radiation of heat from the image forming module 200 at a high rate, thereby it is possible to provide a virtual image display apparatus which is small-sized and thinned.

Next, explanation will be made of the light condensing member 400. The light condensing member 400 is formed of a lens 401 and a lens 402 having positive refractive powers, which are used in combination, and which are both attached to a common housing 403.

A bundle of light rays emanating from the light guide member 300 is led through the light condensing member 400 arranged directly after the light guide member 300 so as to project an image from the real image part 202, in the form of a magnified virtual image at the position of an eye point. Further, the light guide member 300 and the light condensing member 400 are provided being distant from each other, and accordingly, the total reflection at the reflecting part 301b of the light guide member 300 can be efficiently made. With this arrangement, since loss in light quantity can hardly occur even though the light path for light guided by the light guide member 300 is overlapped with the light path for light other than the aforementioned light, transmitting through the light guide member 300, the freedom of the transmission of light through the light guide member 300 can be enhanced, thereby it is possible to enhance the freedom of the shape of the light guide member 300.

At this time, the distance between the light condensing member 400 and the light emanating part 301 of the light guide member 300 is set to be less than 8 mm, and in particular, to be preferably less than 1 mm in order to prevent hindrance to the total reflection at the reflecting part 301b and to miniaturize the virtual image display apparatus 100. It is noted that the lower limit thereof does not cause hindrance to the total reflection if it is greater than the wavelength.

The distance between the end surface of the light condensing member 400 on the housing 50 side and the eye point 404 (that is, the eye relief), is set to be less than about 100 mm, and in particular, to be preferably less than 50 mm. With this arrangement, the affection by the external environment (brightness or the like) can be restrained, thereby the visibility of the virtual image display apparatus can be made to be satisfactory.

It is noted that in this embodiment, although the light condensing member 400 is composed of a plurality of the lenses 401, 402, it may be composed of a single lens or may be compose of more than three lenses. Further, any of convex lenses, aspherical lenses, Fresnel lenses hologram lenses which are formed so as to have a light condensing function may be used.

Further, such an configuration that the length of the locus of light which is emitted from the center of the real image display part 202 of the image forming module 200 and reaches the eye point 404 (that is, the optical path length) is set to be greater than three times as larger as the thickness D of the light guide member 300, can satisfy the optical characteristic of the light guide member 300. Because the optical path length can be made to be longer while the thickness D of the light guide member 300 which is a main factor for determining the size of an electronic apparatus is decreased. Thus, aberration can hardly occur in the light condensing means.

(Second Embodiment)

Figure 5A:
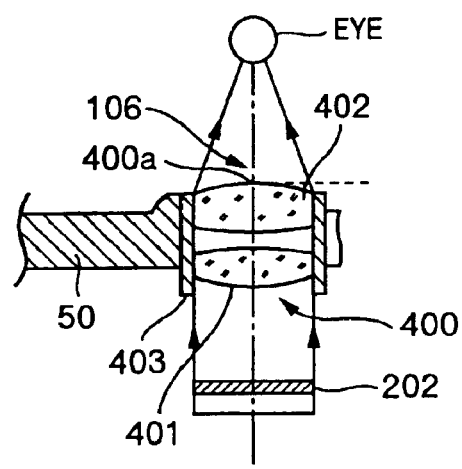
FIG. 5a is a schematic view illustrating a mode of visual characteristics of a virtual image display apparatus in another embodiment of the present invention.
Figure 5B:
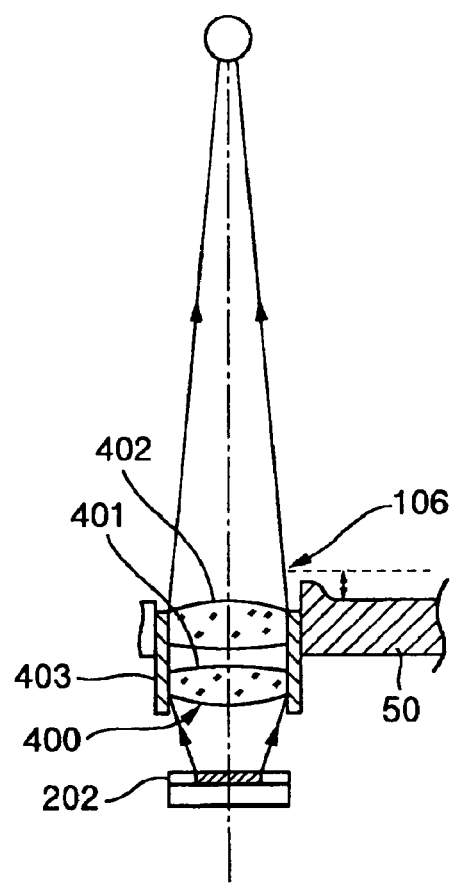
FIG. 5b is a schematic view illustrating a mode of visual characteristics of the virtual image display apparatus in another embodiment of the present invention.
Figure 6A:
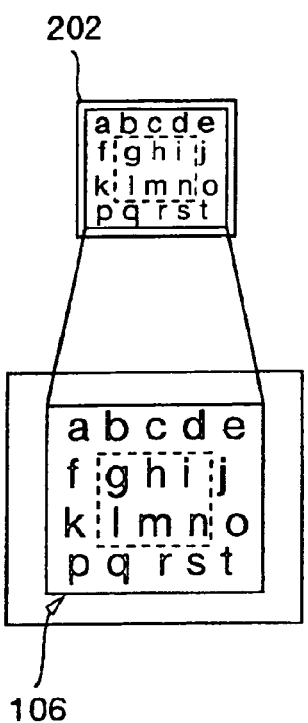
FIG. 6a is a schematic view illustrating a display example in the visual characteristic mode of the present invention shown in FIGS. 5a and 5b.
Figure 6B:
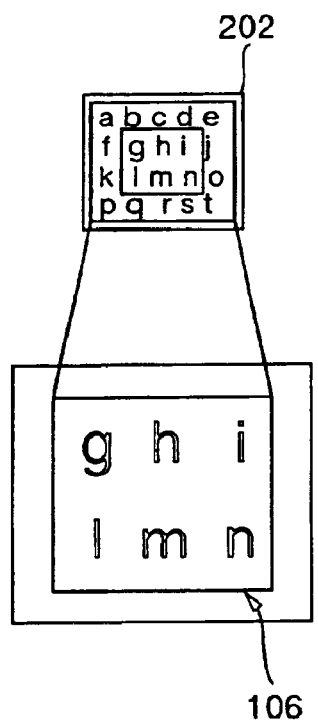
FIG. 6b is a schematic views illustrating a display example in the visual display mode of the invention shown in FIGS. 5a and 5b.

Next, explanation will be made of a mode change of visual characteristics of the virtual image display apparatus with reference to the drawings. FIGS. 5a and 5b are schematic views illustrating the modes of visual characteristics of a virtual image display apparatus in another embodiment of the present invention, FIGS. 6a and 6b are schematic views illustrating display examples in the modes of visual characteristics shown in FIGS. 5a and 5b, FIG. 6a illustrating examples in the case shown in FIG. 5a while FIG. 6b illustrates examples in the case shown in FIG. 5b. FIGS. 5a and 5b show a condition in which the light guide member 300 is linearly developed into an optically equivalent form for the sake of convenience without directly showing the virtual image display apparatus 100 as it is.

Referring to these figure which schematically show the real image display part 202 and the light condensing member 400 having such a function that an image displayed on the real image display part 202 is magnified into a visual virtual image, the light condensing member 400 is composed of one or a plurality of lenses, and has a structure coping with a plurality of visual modes or a plurality of display image modes as mentioned hereinbelow. In this example, explanation will be made of the case having two modes, in particular.

It is noted that two modes correspond respectively to such a case that the distance between the endmost surface part 400a of the light condensing member 400 and the eye (eye point 404), that is, the so-called eye relief is relatively short so as to be in a range of about 10 to 30 mm, as shown in FIG. 5a, that is, the special working distance, (which is hereinbelow referred as "short eye relief), and such a case that the eye relief is relative long so as to be longer than about 30 mm as shown in FIG. 5b, that is, the eye has a long distance from the display window 106 (which will be hereinbelow referred as "long eye relief").

In the case of the short eye relief, it can be configured that the light condensing member 400 is slightly projected outward from the housing 50 of the portable data terminal (in the upward direction as view in figures). A mechanism for projecting the light condensing member 400, is configured in such a way that threads are formed in both the housing 50 and the housing 403 so as to allow the light condensing member 400 to be moved up and down, and also such a way that a protrusion held by a spring is provided at a side surface of the housing 403 while an accommodation part for receiving the protrusion is formed in a side surface of the housing 50 so as to stepwise move the light condensing member 400. Further, as to a drive means for the mechanism, a motor or the like may be used, or it may be manually driven.

By peeping into the display window 106 from the position of a viewing eye relief, an entire pattern (a, b, c, d . . . t) broadly displayed on the real image display part 202 over its whole display area can be projected into a visually magnified virtual image. Accordingly, a substantially all part of the image displayed on the real image display part 202 can be seen as a greatly magnified virtual image, and further, it is possible to prevent someone else nearby from glancing the image while the enlarge image is observed. It is noted that FIGS. 6a and 6b schematically show a magnified virtual image and a real image displayed on the real image part 202, and accordingly, the relationship between the sizes of the images should not be directly limited to that as shown in FIGS. 6a and 6b.

Next, in the case of the long eye relief, the light condensing member 400 is arranged being near to the inside of the housing 50 of the portable data terminal (near to the light guide member 300) in comparison with the case of the short eye relief. In this condition, by peeping into the display window 106 from the position of a predetermined long eye relief, only a limited area in the display area of the real image display part 202 can be projected as a magnified visual virtual image. In this embodiment, a part around the center of the real image display part 202 is magnified.

The reason why the display area is limited as mentioned above, is that the viewing angle is limited by the viewing frame of the light condensing member 400, and accordingly, an apparent display area becomes smaller. Actually, a display pattern (ghilmn) in the center part of the display area of the real image display part 202 is magnified and virtually displayed in the display window 106 (viewing plane), and accordingly, the observer can see a zone exhibiting the display pattern g, h, l, m, n. It is noted that the characters (or a magnification factor of an image) can be arbitrarily selected in accordance with a vision or a use condition since the size of a character on display can become larger in comparison with the short eye relief. Thereby it is possible to provide a virtual image display apparatus having a visibility which is satisfactory and which is convenient in use.

By setting the eye relief to be larger, uncomfortability or uncertainty caused by eye contact can be avoided, and further, a state of the surroundings can be felt in a relatively good condition. In the case of riding a vehicle or the like, or in the case of less display capacity of data such as a telephone number or a name, data can be monitored even from a distant position. At this time, it is preferable to avoid displaying another display area in view of reduction of power consumption since it is out of the viewing field. Further, a group of some persons can observe one and the same image.

Further, a magnification factor which is defined by an apparent display are which can be seen from the display windoe 106 with respect to the display area of the real image display part 202 becomes larger in the case of the long eye relief than in the case of the short eye relief, the visibility in the case of the long eye relief, which has been conventionally low, can be enhanced. Accordingly, it is possible to provide a portable data terminal with which the data can be confirmed even though the user does not bring his eyes, relatively close to the terminal, and which exhibits excellent visibility either in the case of the short eye relief or in the case of long eye relief.

Further, by selecting two modes of visibility, two display configurations having different eye relieves and using methods corresponding to the respective characteristics thereof can be obtained. For example, characters or images which cannot be observed through the short eye relief since they are too small, can be observed through the magnification in the case of the long eye relief.

In this embodiment, although only two modes have been explained, with the provision of a plurality of fixing positions for the light condensing member 400, a plurality of modes can be taken. Further, by enabling the position of the light condensing member 400 to be steplessly adjusted, an indefinite number of modes can be taken.

Further, in this embodiment, although explanation has been made such that a part around the center of the real image display part 202 can be observed through the magnification in the case of the long eye relief, data around an end part of the real image display part 202 can be observed through the magnification when it is observed obliquely by shifting the line of slight from the center.

As mentioned above, since the distance between the light condensing member 400 and the real image display part 202 can be changed by changing the fixing position of the light condensing member 400, the display mode of an image which is virtually magnified and displayed can be changed further. Thereby it is possible to provide a virtual image display apparatus or an electronic equipment which can change the mode of the display of a virtual image observed by the user, depending upon an object of the use thereof.

Further, since the eye relief is changed as the optical distance between the light condensing member 400 and the real image display part 200 is changed, a plurality of display modes having different eye relieves and several methods of use depending upon characteristics owned by the display modes can be obtained, and accordingly, the freedom of the way of observation of the virtual image display apparatus by the user (that is, it is observed by peeping, from a distant position therefrom, by one person or several persons, and so forth) can be enhanced.

Further, depending upon a variation in the optical distance, a part of an image displayed on the real image display part 202, and virtually magnified and externally displayed varies. Further, a part of an image displayed on the real image display part 202, and virtually magnified and externally displayed varies, depending upon a variation in the optical distance between the light condensing member 400 and the real image display part 202, and a display zone optimum for a use condition can be arbitrarily selected by the user, thereby it is possible to provide a virtual image display apparatus which is convenient for use and which has an excellent visibility.

(Third Embodiment)

Figure 7A:
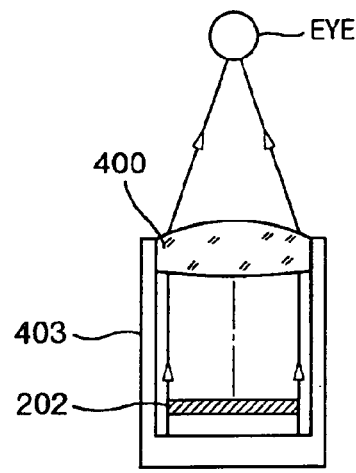
FIG. 7a is a schematic view illustrating the visual characteristic mode of a virtual image display apparatus in another embodiment of the present invention.
Figure 7B:
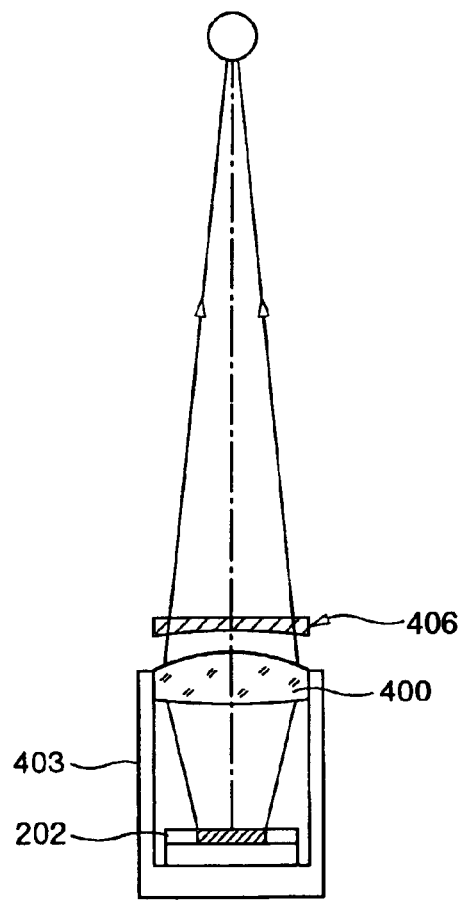
FIG. 7b is a schematic view illustrating the visual characteristic mode of the virtual image display apparatus in another embodiment of the present invention.
Figure 8A:
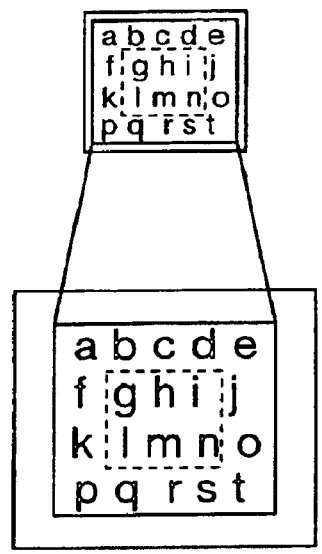
FIG. 8a is a schematic view illustrating a display example in the visual display mode shown in FIGS. 7a and 7b.
Figure 8B:
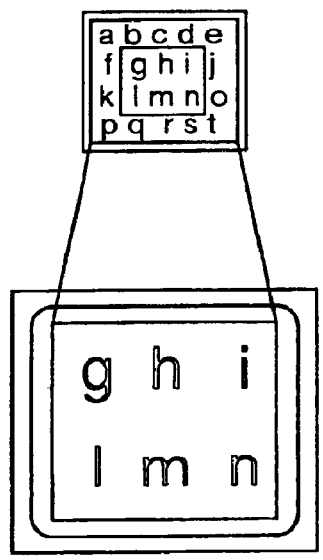
FIG. 8b is a schematic view illustrating a display example in the visual display mode shown in FIGS. 7 and 7b.

Next, explanation will be made of a mode change of visibility of the virtual image display apparatus in a third embodiment, with reference to the drawings. FIGS. 7a and 7b are schematic views illustrating the modes of visibility of a virtual image display apparatus in another embodiment of the present invention, FIGS. 8a and 8b are schematic views illustrating display examples in the modes of visibility shown in FIGS. 7a and 7b, FIG. 8a illustrating an example in the case shown in FIG. 7a while FIG. 8b illustrates an example in the case shown in FIG. 7b. It is noted that FIGS. 7a and 7b do not show the light guide member 300 for the sake of convenience.

Referring to FIGS. 7a and 7b which schematically show the real image display part 202 and the light condensing member 400 (which is composed of a single lens) having such a function that an image displayed on the real image display part 202 is magnified into a visual virtual image, explanation will be made of the case having two modes, that is, a short eye relief in which the eye relief is relatively short so as to be in a range of about 10 to 30 mm, and a long eye relief in which the eye relief is relatively long so as to be longer than about 30 mm so that the eye has a long distance from the display window 10.

It is noted that the light condensing member 400 is set to be stationary so as to be unmovable in this embodiment, and accordingly, it is configured that the short eye relief is always set in a normal condition. Further, by peeping into the display window 106 from the position of a predetermined short relief, the whole pattern (abcd . . . rst) displayed broadly on the real image display part 202 over its entire display area can be projected in the form of a visually magnified virtual image.

Next, in the case of the long eye relief, a correction member 406 is inserted between the light condensing member 400 and the eye. In this condition, by peeing into the display window 106 from the position of a predetermined long eye relief, a limited area in the display area of the real image display part 202 can be projected in the formed of a magnified virtual image in the viewing filed. In this embodiment, a part around the center of the real image display part 202 is enlarged. The reason why the display area is limited as mentioned above is that the viewing angle is limited by the viewing frame of the light condensing member 400, and accordingly, the apparent viewing field is decreased. Actually, as shown in FIG. 8b, a display pattern (ghilmn) of a part around the center of the display area of the real image display part 202 is virtually magnified and displayed in the display window 106 (viewing plane), and accordingly, the observer can observes a zone where the display pattern (ghilmn) is displayed. It is noted that an image can be displayed having an increased size per character.

The correction member 406 may be removably mounted as an attachment to the portable data terminal or may be slid in substantial parallel with the display window 106. Further, a liquid crystal lens is provided at the display window so as to be energized and deenergized by a voltage, or the light condensing member 400 and the real image display part 202 may be formed of a group of lenses having a negative refractive power so as to change distances between the lenses. Further, one of a plurality of lenses may be formed of a liquid crystal lens, or a flip member with which the manipulation part 103 is covered may be provided so that the correction member 406 may be previously attached to a part which is opposed to the display window 106 when the flip member is closed.

With this arrangement, it is possible to provide the portable data terminal which has a simple structure, which has a plurality of modes of visibility and which is excellent in visibility. Further, since the freedom of the way of how to observe a virtual image display can be increased, it is possible to provide a virtual image display apparatus which is relatively convenient in used.

It is noted the correction member 406 is provided between the light condensing member 400 and the real image display part 202, it may be provided at any position if it is located between the real image display part 202 and the eye.

(Fourth Embodiment)

Figure 9A:
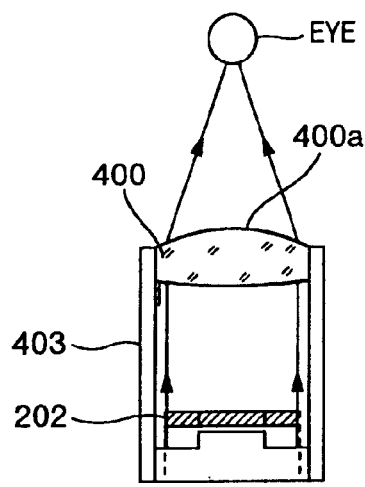
FIG. 9a is a schematic view illustrating the visual characteristic mode of the virtual image display apparatus in another embodiment of the present invention.
Figure 9B:
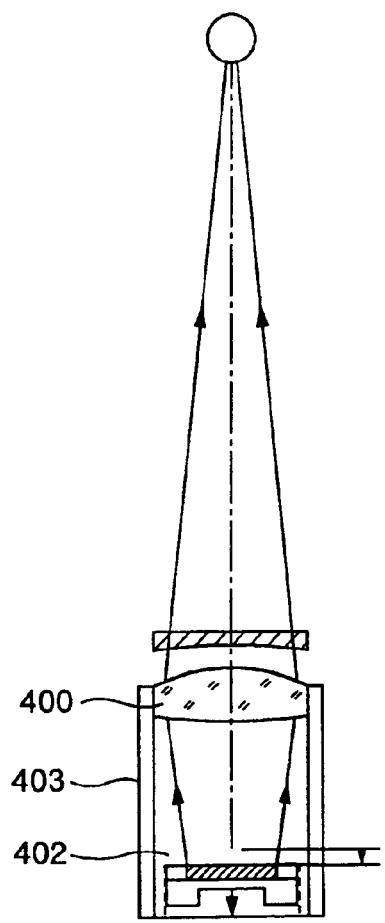
FIG. 9b is a schematic view illustrating the visual characteristic mode of the virtual image display apparatus in another embodiment of the present invention.

Next, explanation will be made of a mode change of visibility in a fourth embodiment. FIGS. 9a and 9b are schematic views illustrating the modes of visibility of a virtual image display apparatus in another embodiment of the present invention. It is noted that both FIGS. 9a and 9b do not show the light guide member 300 for the sake of convenience. FIGS. 9a and 9b schematically show the light guide member 300 and the light condensing member 400 (which is composed of a single lens in this embodiment) which has such a function that an image displayed on the ream image display part 202 through the intermediary of the light guide member 300 is magnified into a visual virtual image. Explanation will be made of the case of a short eye relief and the case of a long eye relief, respectively.

In this embodiment, the eye relief is adjusted by moving the image forming module 200 in its entirety or the real image display part 202, relative to the light condensing member 400.

Referring to FIG. 9a which shows a use condition in the case of the short eye relief, by causing the image forming module 200 or the real image display part 202 to approach the light condensing member 400, an image displayed on the real image display part 202 is magnified by the light condensing member 400 into a virtual image and accordingly, the whole displayed image on the real image display part 202 can be projected. In this phase, the optical systems is configured in such a way that an image can be observed with the distance between the topmost part 400a of light condensing member 400 and the outer surface of the eye of the observer, that is, the eye relief being held to be relatively short so as to be in a range form 10 to 30 mm.

Referring to FIG. 9b which shows the case of the long eye relief, the basic configuration of the optical system is the same as that shown in FIG. 9a, but the real image display part 202 is shifted away from the light condensing member 400 (that is, away from the observer) in comparison with the case of the short eye relief while the eye relief is held to be longer than 30 mm. Accordingly, there is no such a risk that the eye of the observer is made into contact with the light condensing member 400 or the display window 106, having a distance sufficient for easily and rapidly observing an image. Since the real image display part 202 is set to be distant away as mentioned above, an image can be precisely focused as viewed by the observer, and by setting the long eye relief, a part of a display image which is narrow more or less, rather than the entire display image, can be observed after being magnified.

It is noted that slight shift of the real image display part 202 away from the light condensing member 400 (away from the observer) is equivalent to such a case that the real image display part 202 is shifted away from the light guide member 300 in an example using the light guide member 300 as shown in the first embodiment. Further, slight shift of the real image display part 202 toward the light condensing member 400 (toward the observer) is equivalent to such a case that the real image display part 202 approaches the light guide member 300 in an example using the light guide member 300 as shown in the first embodiment.

Thus, by shifting the real image display part 202 away from the observer from the short eye relief condition, the long eye relief condition is effected so that a part of the display image can be observed fully over the entire display window, and accordingly, an image which can be easily observed by the user can be provided without changing several conditions including the shapes, the positions or the like of the display window and a part therearound, thereby it is possible to provide a virtual image display apparatus which is convenient in use.

Further, by changing the position of the real image display part so as to change the optical distance between the real image display part 202 and the light condensing member 400, the step for changing the optical distance in the housing of the virtual image display apparatus can be completed, and accordingly, a change of the shape such that a member (for example, the light condensing member 400) is projected from the housing can be minimized, thereby it is possible to provide a virtual image display apparatus which is convenient in use.

Further, in comparison with such a case that the position of the light condensing member 400 is changed, the projection of the member toward the user can be reduced or eliminated, and accordingly, occurrence of inconveniency such as that a projected part strikes upon the face of the user, can be restrained. Further, the virtual image display apparatus can be prevented from being outward deformed, and accordingly, the freedom of the arrangement of the design thereof can be enhanced.

(Fifth Embodiment)

Figure 10A:
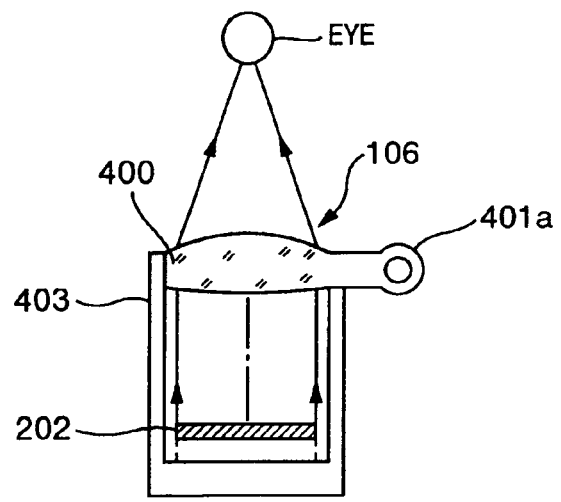
FIG. 10a is a schematic view illustrating the visual characteristic mode of the virtual image display apparatus in another embodiment of the present invention.
Figure 10B:
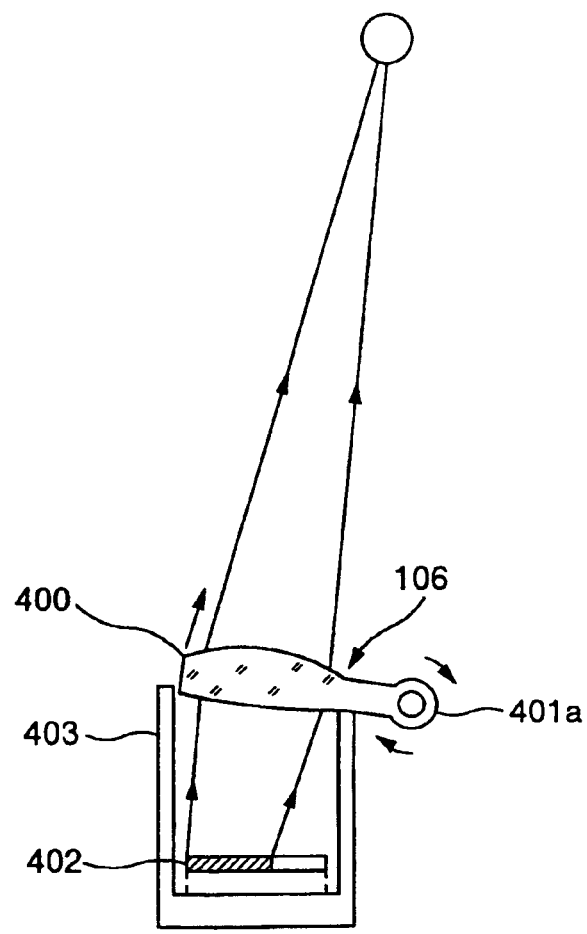
FIG. 10b is a schematic view illustrating the visual characteristic mode of the virtual image display apparatus in another embodiment of the present invention.
Figure 11A:
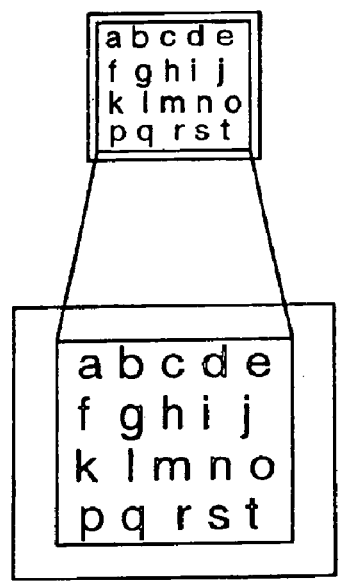
FIG. 11a is a schematic view illustrating a display example in the visual characteristic mode of the present invention shown in FIGS. 10a and 10b.
Figure 11B:
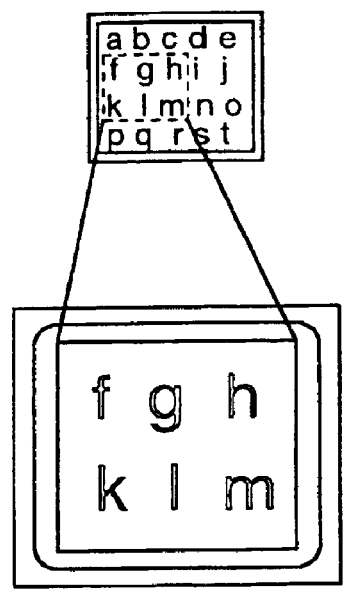
FIG. 11b is a schematic view illustrating a display example in the visual characteristic mode of the present invention shown in FIGS. 10a and 10b.

Next, explanation will be made of a mode change in a fifth embodiment. FIGS. 10a and 10b are schematic views illustrating the modes of visual characteristics of a virtual image display apparatus in another embodiment of the present invention. FIGS. 11a and 11b are schematic views illustrating display examples in the modes of visibility shown in FIGS. 10a and 10b, FIG. 11a illustrating a display example in the case shown in FIG. 10a and FIG. 11b illustrating a display example in the case shown in FIG. 10b. It is noted that both FIGS. 9a and 9b do not show the light guide member 300 and the like for the sake of convenience.

Referring to FIG. 10a which shows a use condition in the case of the short eye relief, a display image (a to t) displayed on the real image display part 202 can be observed in its entirety, after it is magnified into a virtual image by the light condensing member 400, as shown in FIG. 11a. In this case, the optical system is configured so that the image can be observed with the eye relief being held to be relatively short so as to be in a range from 10 to 30 mm.

Further, referring to FIG. 10b which shows the use condition in the case of the long eye relief. The lens 401 used for the light condensing member 400 is in part prolonged so as to form a bearing part 401a thereof. Further, this bearing part 401a is fitted on a rotary shaft (which is not shown) provided to the housing 403 so as to be rotatable over a predetermined angle.

When the lens 401 is rotated, the lens 401 causes the rotary shaft to be slightly inclined while the eye relief is held to be longer than 30 mm. That is, the optical axis of the light condensing member 400 can be inclined with respect to the optical axis of the emanating light from the light guide member 300 or the like. Thus, such an occasion that the eye of the observer touches the light condensing member 400 or the display window can be substantially eliminated. Further, a display image can be observed with a long distance which is sufficient for easily and rapidly observing the image. Further, by effecting the long eye relief, a relatively narrow part (fghklm), as shown in FIG. 11b, of a display image on the real image display part 202 is observed, rather than the entire display image, and further, the display limited to this part is used. An image which can be displayed (in an image range which is visible through inclination) can be arbitrarily adjusted by changing the angle or the direction of inclination of the light condensing member 400.

By slightly inclining the lens, as mentioned above, from the short eye relief condition so as to cause pop-up, a display image can be observed in the long eye relief condition. Further, the mode of observation can be changed with a relatively simple structure, and by inclining the light condensing member 400 so that the user observes the virtual image display apparatus 100 out of the center axis of the light led from the real image display part 202, an end part zone distant from the center of the display zone of the real image display part 202 can be magnified and displayed. Further, by allowing the direction of inclination of the light condensing member 400 to be variable, the real image display part 202 can be covered by a plurality of enlarged side part zones, and accordingly, it is possible to provide a virtual image display apparatus which is excellent in visibility.

(Sixth Embodiment)

Figure 12:
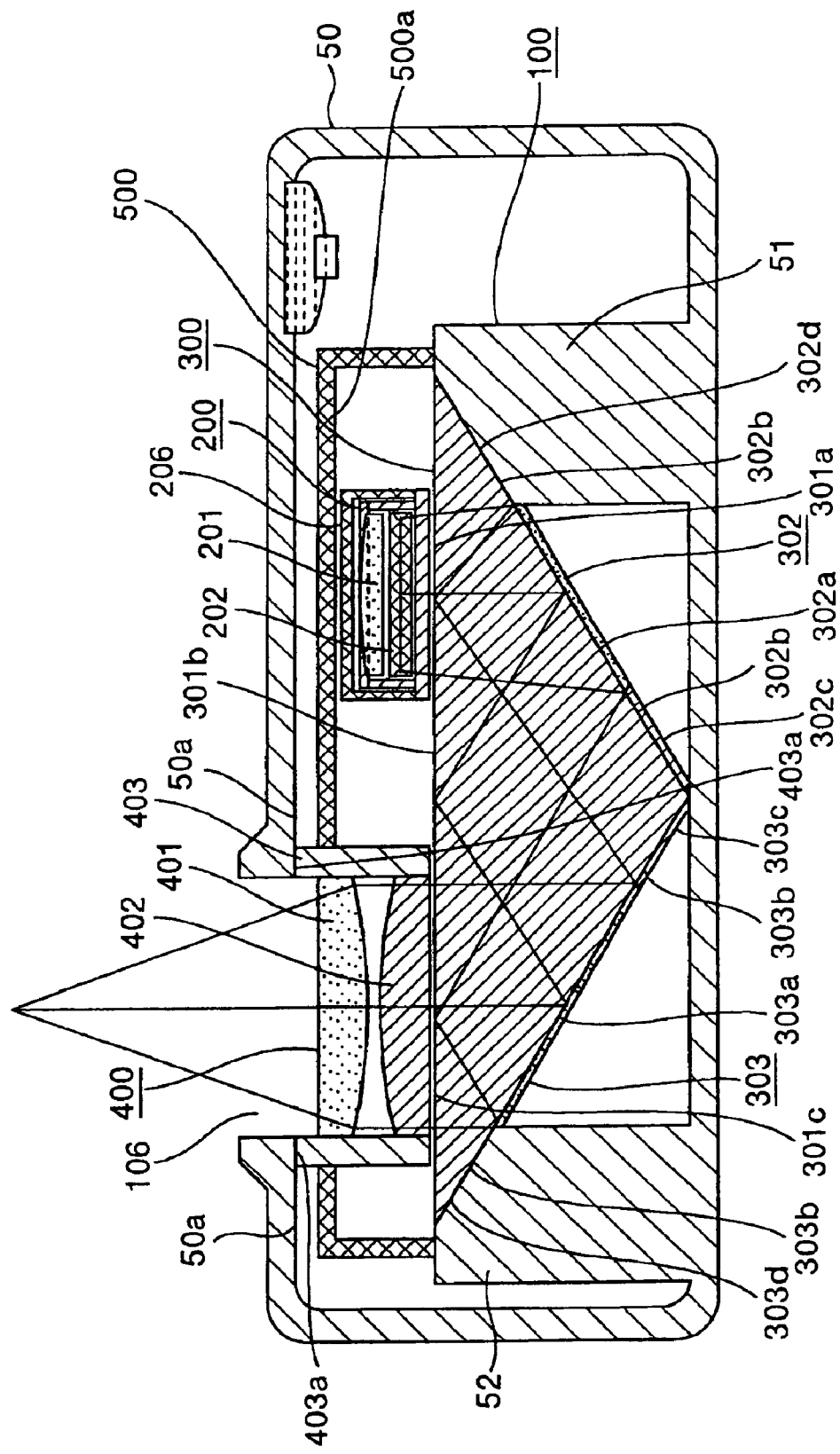
FIG. 12 is an enlarged sectional view along line A–A' in FIG. 1.

Next, explanation will be hereinbelow made of another embodiment of a virtual image display apparatus and an electronic equipment incorporating thereof according to the present invention, in which a countermeasure against stray light is made, with reference to the drawings. FIG. 12 is an enlarged sectional view along line A–A' in FIG. 1. As in this embodiment, if the virtual image display apparatus is miniaturized, the image forming module 200 and the light condensing member 400 are arranged being closely adjacent to each other, and further, the light condensing member 400 and the display window can be arranged being closely adjacent to each other. Accordingly, of light emitted from the image forming module 200, light which is incident upon the light condensing member 400 or the display window 106 without passing through a predetermined optical path, (which will be denoted as "stray light), is likely to be generated. Thus, the countermeasure against the stray light will be explained.

At first, a light shielding member 206 is provided outside of the image forming module 200. This light shielding member 206 is arranged so as to surround the backlight device 201 of the image forming module 200, the real image display part 202 and the like. Of light emitted from the backlight device 201, the real image display part 202 and the like, stray light which is not directed toward the incident part 301 of the light guide member 300 is blocked by the light shielding member 206. By forming the light shielding member 206 from a material which has a high light absorption rate, the stray light can be efficiently absorbed and deterioration of the optical characteristics, caused by the stray light can be restrained. Specifically, it is preferable to use a material having a light reflectance rate of lower than 10% or a light absorption rate of higher than 85%, and preferably higher than 90% since the stray light can efficiently shielded. As such a material, a metal or resin material having an outer surface coated thereover with thick color or black color pigment or dye, black or thick color resin material or the like may be used. Further, a light absorbing film may be formed on the inner surface 206a of the light shielding member 206 in order to surely block the stray light. In the case of formation of the light absorbing film, it is preferably to use a material having a suitably high heat radiation for the light shielding member 206 since heat generated from the light absorbing film can be readily radiated. As to such a material, iron, nickel, tin, copper or alloy thereof may be preferably used, having a thickness of 0.5 to 5 mm for increasing the heat capacity so as to enhance the heat radiation.

Next, in the first internal reflecting surface 302 and the second internal reflecting surface 303 of the light guide member 300, there are presented parts in which reflecting films 302a and 303a for reflecting light passing through a predetermined optical path in the light emitted from the image forming module 200 are formed, and stray light incident parts 302b, 303b upon which light other than the light emitted from the image forming module 200 and passing through the predetermined optical path in the light guide member 300, that is, light components casing the stray light is incident. In this arrangement, light absorbing films 302c, 303c are formed on at least the stray light incident parts 302b, 303b so as to absorb stray light. Accordingly, since the reflection of light other than light passing through the predetermined optical path can be restrained at the first internal reflecting surface 302 and the second internal reflecting surface 303, the stray light components are reflected in the light guide member 300, and is then incident upon the light condensing member 400, and accordingly, it is possible to prevent the stray light from being incident upon the eye of the user after passing through the display window 106 so as to cause a disturbed image to be visible. The light absorbing films 302c and 303c having the above-mentioned fucntion may be made of a material such as Ti, Si, $TiO_2$, $SiO_2$, MgF, $Ta_2O_5$ or the combination thereof.

Further, even a material other than the material, having a light absorbing characteristic which can absorb higher than 85% or preferably higher than 90% of light energy can sufficiently absorb the stray light, and accordingly, it is possible to restrain disturbance of an image which is visible through the display window to such a degree which cannot be recognized by the user.

Further, in the stray light incident parts 302b, 303b, surfaces 302d, 303d which abut on support parts 51, 52 for supporting the light guide member 300 are preferably formed thereon with light absorbing films, similar to the light absorbing films 302c, 303c, for preventing the stray light components from being reflected so as to restrain occurrence of stray light components. Further, in addition to the light guide member 300, light absorbing films may be formed on contact surfaces 51a, 52a o the support parts 51, 52, making contact with the light guide member 300, or the support parts 51, 52 may be made of bakelite, a black material containing carbon, a black material kneaded therein with black paint or the like. Thus, light incident upon the surfaces 302d, 303d can be sufficiently absorbed, thereby it is possible to restrain occurrence of stray light components.

Next, the housing 403 of the light condensing member 400 holds therein the lenses 401, 402 and is formed so as to surround the light condensing member 400 in order to prevent light other than light passing through the predetermined optical path from being incident upon the lenses 401, 402, thereby it is possible to block the stray light.

An end surface 403a of the housing 403 on the display window 106 side is provided, being preferably adjacent to a surface 50a of the housing 50 since the stray light leaking from a space between the housing 50 of the portable data terminal and the housing 50 of the light condensing member 400 can be minimized. Specifically, the distance between the end surface 403a and the surface 50a is set to be less than 15 mm in order to effectively restrain the stray light from leaking.

Further, the image forming module 200 and the light guide member 300 are covered thereover with a light shield member 500 so as to block the stray light leaking from the image forming module 200 and the light guide member 300, thereby it is possible to restrain the stray light from entering the light condensing member 400 and the display window 106. The light shield member 500 preferably cover at least the entire first surface 301 of the light guide member 300, and more preferably, covers not only the outer surface of the first internal reflecting surface 302 and the outer surface of the second internal reflecting surface 303 but also the side surfaces thereof. With this arrangement, not only the stray light generated from the image forming module 200 but also the stray light leaking from the light guide member 300 can be substantially blocked. Thus, it is possible to prevent the stray light entering the light condensing member 400 and the display window 106, and thereby, it is possible to restrain deterioration of the optical characteristics caused by entrance of the stray light. Thus, the visibility can be enhanced.

Figure 13:
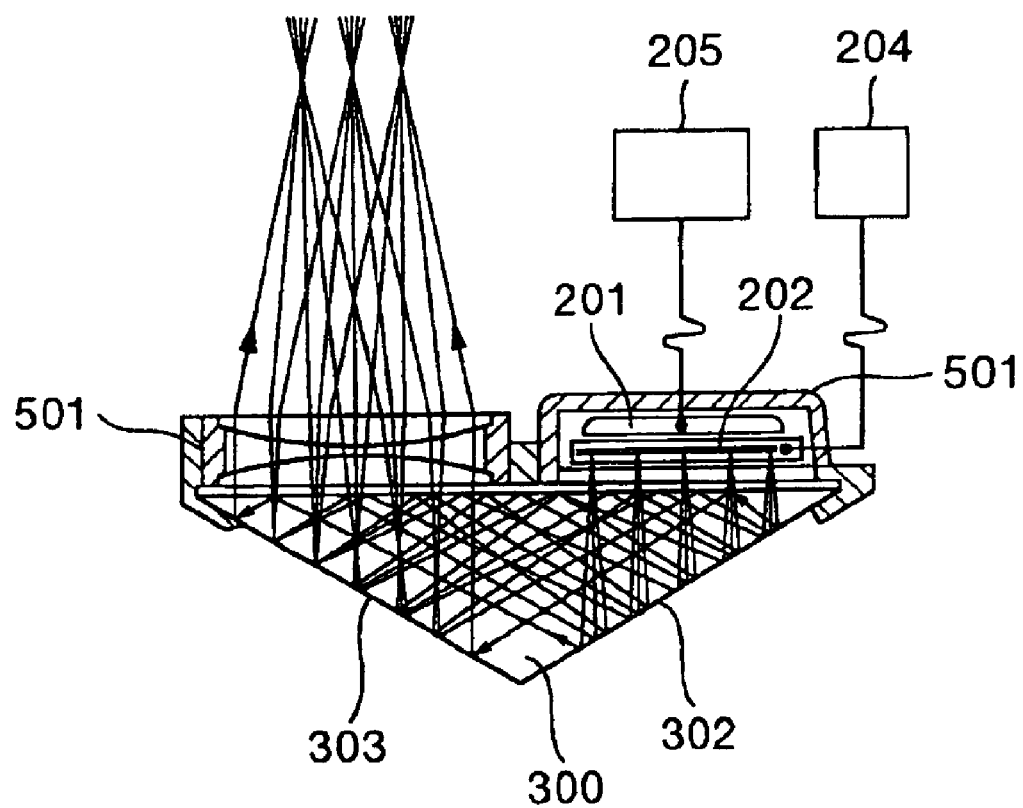
FIG. 13 is an enlarged sectional view illustrating a portable data terminal which is mounted thereon with a virtual image display in an embodiment of the present invention.

This light shielding member 500 is preferably made of a material having a high light absorbing rate, similar to the light shield member 206, since the stray light can be efficiently blocked, and accordingly, it is possible to prevent deterioration of the optical characteristics caused by the stray light components. Specifically, a material having a light reflectance rate of lower than 10% or a light absorption rate of higher than 85% or preferably higher than 90% is preferably used for efficiently blocking the stray light. As to such a material, a metal material such as aluminum, iron, nickel, tin, copper and alloy thereof, which is blackened, may be used, or synthetic resin, carbon material or the like may be used. A light shielding film may be formed on the inner surface 500a of the light shielding member 500. It is noted that although the light shielding member 206, the light shielding member 500 and the like are provided, separate from one another in this embodiment, as shown in the enlarged sectional view illustrating the portable data terminal incorporating the virtual image display apparatus in this embodiment of the present invention, shown in FIG. 13, these are formed with a single cover member 501 so as to substantially cover the image forming module 200 and the light guide member 300. Further, the cover member 501 for removing stray light may be integrally formed in its entirety, and may be also used as a housing structure for holing the light condensing member and the image forming module.

Further, painting (which is not shown) is made for the outer peripheral surface of the light guide member 300, except the first surface 301 thereof in order to prevent external light from entering, and the optical system is preferably subjected to a process for preventing unnecessary light from entering, over the entire zone of the substantial part of the entire periphery thereof, since stray light other the light passing through a predetermined optical path, may be prevented from reentering the light guide member 300.

Figure 14:
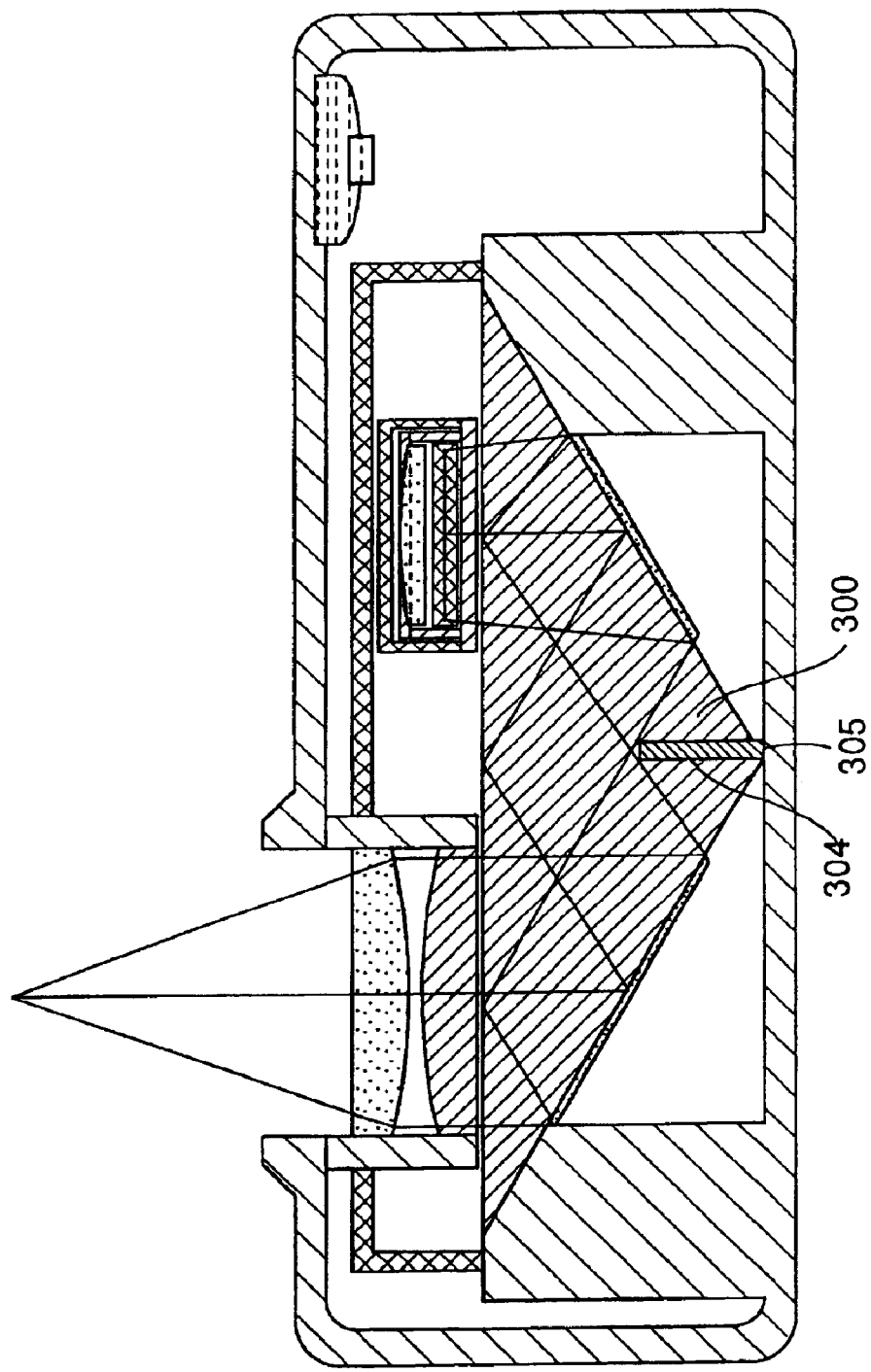
FIG. 14 is an enlarged sectional view illustrating a portable data terminal which is mounted thereon with a virtual image display apparatus in an embodiment of the present invention.

In addition to the above-mentioned countermeasures against the stray light in the light guide member 300, there may be used a configuration shown in FIG. 14 which is an enlarged sectional view illustrating a portable data terminal incorporating a virtual image display apparatus in an embodiment of the present invention.

Referring to FIG. 14, a recess 304 is formed in a part upon which only light other than light passing through the inherent optical path of the virtual image display apparatus 100, is incident, (that is, the part which is around the center of the lower part of the light guide member 300), and a light shielding member 305 is inserted in the recess 304. This light shielding member 305 blocks light which causes the stray light other than light passing through the predetermined optical path. This light shielding member 305 is preferably made of a material having an excellent light absorbing characteristic, and having a thermal expansion and contraction characteristics which resemble to that of the light guide member 300 which is caused by variation in temperature. Specifically, the linear expansion coefficient of the light shielding member 305 is set to be within ±10% of that of the light guide member 300, and accordingly, such a disadvantage as a breakage or the like of the light guide member 300 or the light shielding member 305 can hardly occur. Further, instead of insertion of the light shielding member 305, a light shielding means such as a light absorbing film may be formed in the recess 304.

Figure 15:
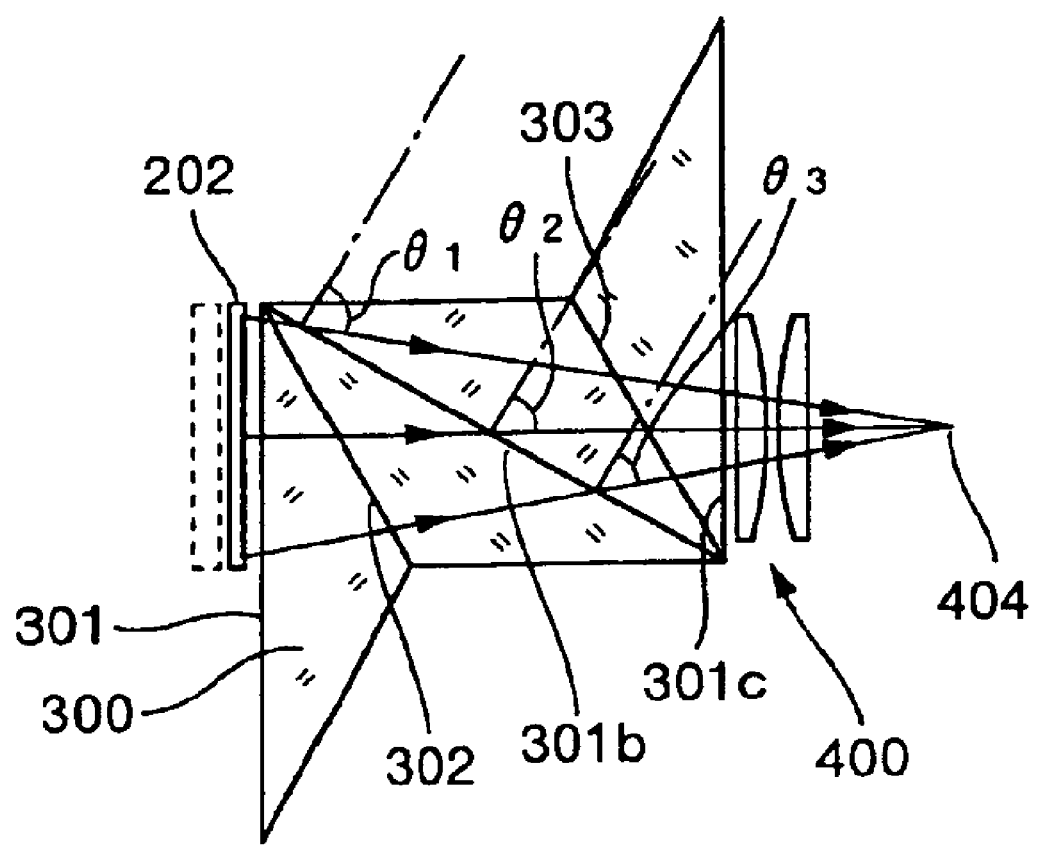
FIG. 15 is a sectional view illustrating a light guide member in the virtual image display apparatus.

Next, consideration will be made of the configuration of the light guide member 300 which is in particular formed of an optical prism having a triangular sectional shape. Referring to FIG. 15 which is a sectional view, in which the light guide member in the virtual image display apparatus 100 is developed at a reflecting surface, along the optical axis, and in which the optical prism having a triangular cross-sectional shape and constituting the light guide member 300 is developed at a reflecting surface, along the optical axis of the light condensing member 400 in order to easily understand the optical path of the light beam in the optical system.

Referring to FIG. 15, a light beam emitted from the real image display part 202 in the image forming module 200 is mirror-surface-reflected at the first internal reflecting surface 302 of the light guide member 300 (although it is apparent in the figure that no light is reflected, the light beam is actually reflected), and thereafter, the light beam is incident upon the reflecting part 301b of the first surface 301. In the reflecting part 301b, the light beam is reflected at the second internal reflecting surface 302 with a reflectance rate of substantially 100% through the total reflection even thought it is not subjected to a process for enhancing, in particular, the reflectance rate, and then, the light beam emanates from the light emanating part 301c of the first surface 301. Then, it is incident upon the eye point 404 through the intermediary of the light condensing member 400.

Now consideration will be particularly made of the incident angle of the light beam incident upon the reflecting part 301b of the first surface 301. The first surface 301 has a plurality of roles, that is, receiving the incident light beam, emanating the light beam and reflecting the light beam, and the parts effecting these roles are partly overlapped with one another if the light guide member 300 is small-sized. Accordingly, should the reflecting part 301b be subjected to a process for enhancing the reflectance rate, detrimental affection would be exerted to the incident light beam and the emanating light beam, and accordingly, a virtual image display apparatus 100 which displays an image having a low quality would be provided. Accordingly, in this embodiment, the reflection by the reflecting part 301b is made through the total reflection. However, if the angle (the central angle thereof is $\theta 2$) of an incident light beam become smaller than a predetermined angle (a light beam exceeding $\theta 3$) in the case of the total reflection, light which is transmitted and refracted with no reflection leaks from the light guide member 300 toward the display window 106 and the light condensing member 400.

Further, the side of an image which can be seen by the user, greatly depends upon an viewing angle for observation, and this viewing angle for observation greatly depends, in turn, upon the diameter of a light beam incident upon the light condensing member 400. This beam diameter depends upon divergence of the light from the image forming module 200, which is caused by the light guide member 300, but if the viewing angle becomes excessively large, there would be caused such condition that the terms of the total reflection cannot be held in the reflecting part 301b at the peripheral part of an image to be observed, (as to a light beam exceeding $\theta 1$ or $\theta 3$). Thus, stray light would possibly occur.

In consideration with the terms for the configuration of an optical system for radically remove this stray light, higher than 95% of the total quantity of light ($\theta 1$ to $\theta 3$) should be exceed an incident angle of 40 deg. or preferably exceeds an incident angle of 45 deg. Further, as to a light beam exceeding the critical angle (a light beam having an incident angle of less than 40 deg, for example, a light beam exceeding $\theta 3$), any of the image forming module 200, the light shielding member 206, the light shielding member 500 and the housing 403 is arranged in the propagating direction of the light beam in order to block the stray light. With this arrangement, even the stray light leaking from the light guide member 300 is not substantially incident upon the display window 106 or the lenses 401, 402 of the light condensing member 400, and it is possible to prevent the visibility of the virtual image display apparatus from being lowered due to the stray light.

Further, in such a range that the maximum value of the viewing angle for observation, obtained by the light condensing member 400 does not exceed an entire width angle of 60 deg, the diameter of the light beam incident upon the reflecting part 301b can be decreased so as to easily satisfy the terms of the total reflection, thereby it is possible to restrain occurrence of the stray light.

Figure 16:
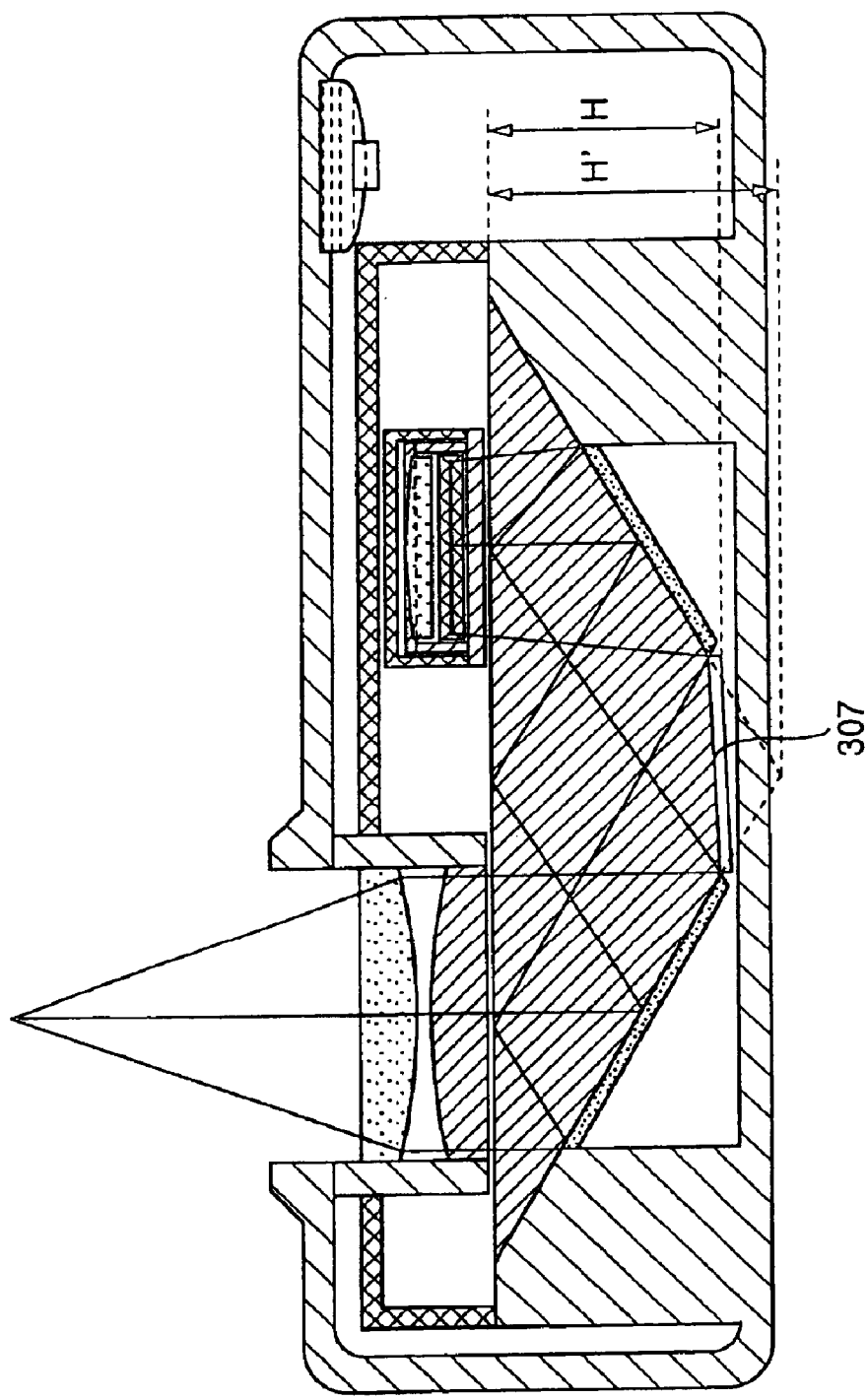
FIG. 16 is an enlarged sectional view illustrating a portable data terminal which is mounted thereon with a virtual image display apparatus in an embodiment of the present invention.

The light guide member 300 may have another structure. Referring to FIG. 16 which is an enlarged sectional view illustrating a portable data terminal incorporating therein a virtual image display apparatus in an embodiment of the present invention, a part upon which only light other than light passing through an optical path inherent to the light guide member 300, (which is a part around an apex of the light guide member 300 shown in FIG. 16 in this embodiment) is cut off. With this arrangement, the height H' of the light guide member 300 can be made to be smaller than the height H in the case of the triangular shape, and accordingly, the virtual image display apparatus and the portable data terminal can be miniaturized and thinned.

Further, a light absorbing film is formed on a surface 307 obtained by cutting so as to reduce stray light generated in the light guide member and caused by internal irregular reflection. Since the number of surfaces on which a light absorbing film is formed, can be preferably reduced to one, a film coating process for the light guide member 300 can be simplified, thereby it is possible to enhance the productivity of the light guide member 300 and as well to aim at uniforming the characteristics of the film formed thereon.

(Seventh Embodiment)

Figure 17:
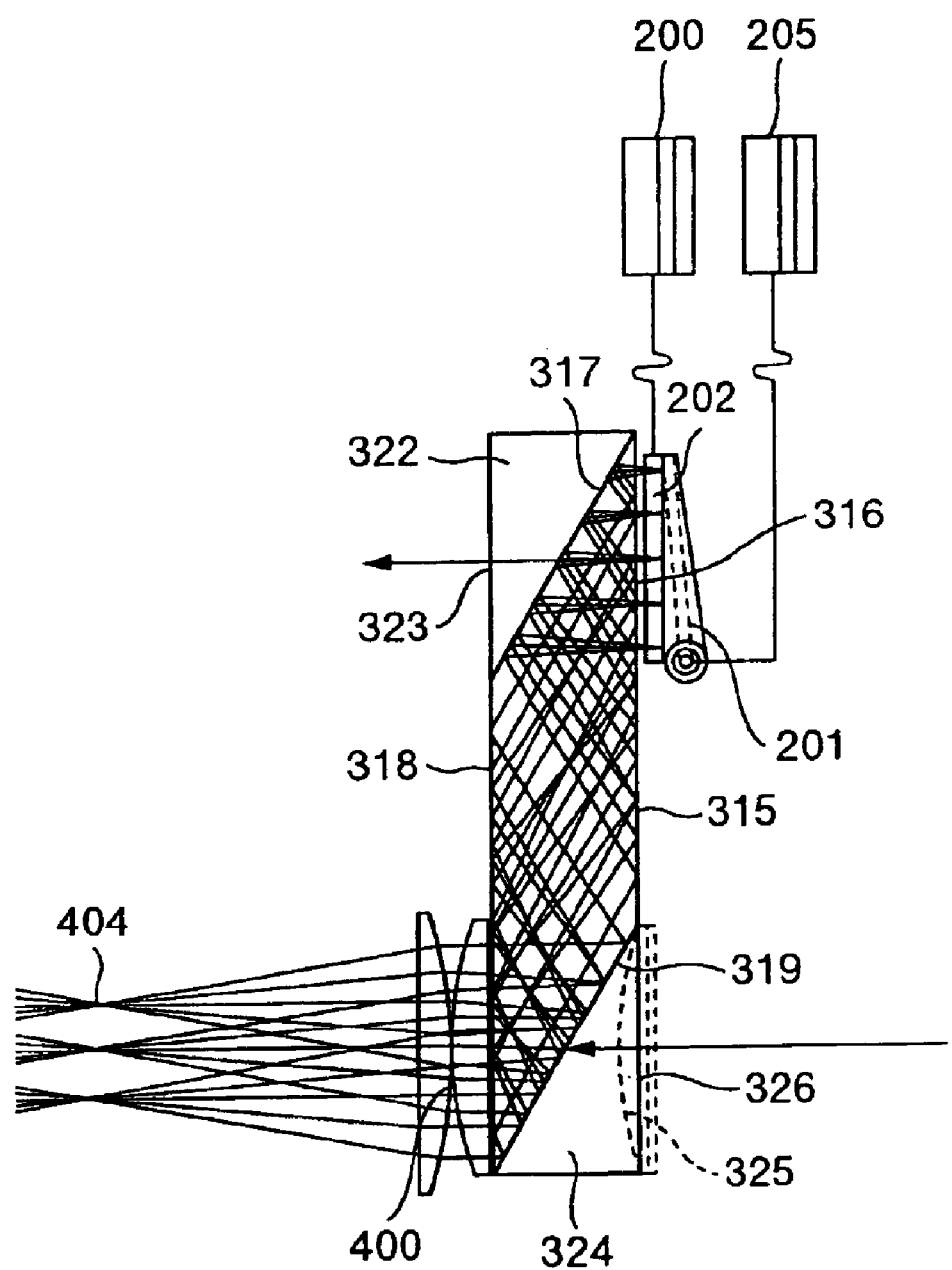
FIG. 17 is a view illustrating a configuration of a display apparatus in another embodiment of the present invention.
Figure 18:
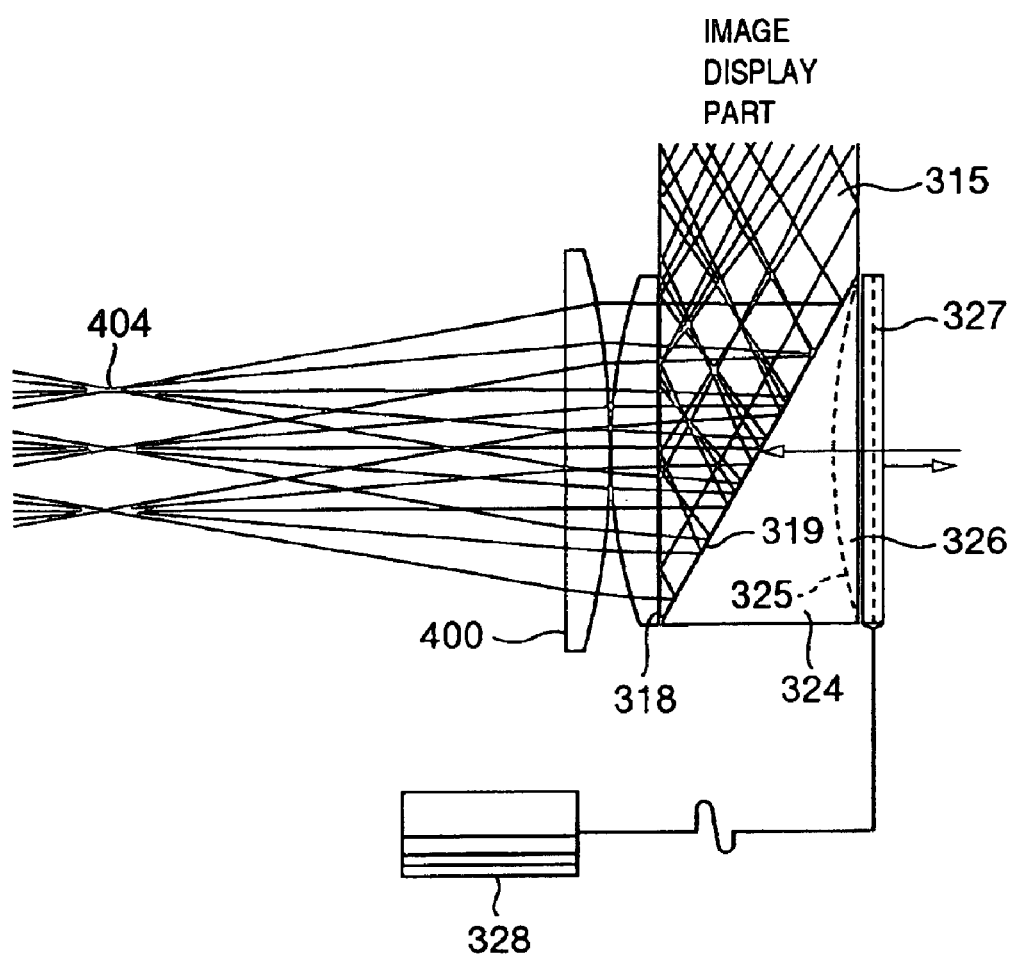
FIG. 18 is an enlarged view illustrating an essential part in FIG. 17.

Next, explanation will be made of another structure of the light guide member 300. FIGS. 17 is a view illustrating the arrangement of a display device in another embodiment of the present invention, and FIG. 18 is an enlarge view illustrating an essential part shown in FIG. 17. Referring to FIGS. 17 and 18, explanation will be made of another optical system according to the present invention, and peripheral parts therearound. A backlight device 201 serves as a light source required for projection when it is fed thereto with a power from a backlight power source 205. A real image display part 205 for reproducing an image from an image data signal transmitted from an external image forming module 200 produces an image. These basic structures are the same as that of the embodiments mentioned above. The feature of this embodiment is such that an optical prism 315 in a quadrate columnar shape having a substantially parallelogram section is used, instead of the light guide member 300. The optical prism 315 according to this embodiment of the present invention can be advantageously used in the case of ensuring a predetermine distance between the real image display part 202 and the display window 106 (prolonging the distance). Diffused light emitted from the backlight device 201 passes through the real image display part 202 so as to form a bundle of light rays containing image data. This bundle of light rays at first incident upon the optical prism 315. The incident position is one of side surfaces of the optical prism 315, and in a part of an incident surface (the second internal reflecting surface) 316. The incident surface (the second internal reflecting surface) 316 is exhibited as a part since it has a plurality of functions similar to the first surface 301 shown in FIG. 4, as mentioned above.

The bundle of light rays is incident upon the optical prism 315, and is then reflected in part at a first internal reflecting surface 317 which is substantially planar and which is formed of a half mirror made of a dielectric multiplayer film. The remainder of the light transmits through the optical prism 315 so as to emanate outside therefrom.

A bundle of light rays which is further reflected is reflected at a second internal reflecting surface 316 which is substantially planar, which is one and the same plane as that of the incident surface 315. The reflection at the second internal reflecting surface 316 becomes total reflection ruled by the Snell's Law. Accordingly, no film coating made of metal or a dielectric multi-layer film, as mentioned above, for enhancing the reflectance rate is in particular required, and further, no special process for attaining the object of enhancing the reflectance rate is applied. Further, the bundle of light rays reflected at the second internal reflecting surface 316 reaches a third internal reflecting surface 318 having the same function as that of the second internal reflecting surface 316 as mentioned before.

Further, the bundle of light rays, after being reflected at the third internal reflecting surface 318 through the total reflection, reaches a fourth internal reflecting surface 319 which has the same function as that of the first internal reflecting surface 317 as mentioned before, and accordingly, reflects a part of the light rays but transmits therethrough the remainder of the light rays. The reflected light rays emanates outside from a light emanating surface 318 which is the same plane as that of the third internal reflecting surface 318. That is, the bundle of light rays repeats the internal reflection by four times within the optical prism 315. The bundle of emanating light rays is led through the light condensing member 400 located just after the light guide member 300 and having a positive refractive power so as to be projected in the form of a magnified virtual image which is obtained by visually magnifying an image displayed on the real image display part 202, in the viewing field (the position of the eye point corresponds to a position 404 in the figure).

The light rays transmitted without being reflected at the first internal reflecting surface 317 contains the image data from the real image display part 202, similar to the reflected right rays, and accordingly, it can directly exhibit effective image information to the observer by a certain display method even though it is not magnified into a virtual image. Further, since the display is substantially direct, the position of the eye point can have a sufficient distance without being specified by the light condensing member 400, a using method having an increased freedom can be provided, and mental uncomfortability caused by eye touch can be eliminated.

Further, a liquid crystal or mechanical shutter mechanism (which is not shown) is located at the first internal reflecting surface 317 or at a position extremely near thereto, and accordingly, stray light generated during observation of a virtual image can be eliminated. Further, a correction prism 322 having a substantially triangular columnar shape and making contact with the first internal reflecting surface 317 is provided, and accordingly, a display image can be observed in front without being curved. An emanating surface 323 of the correction prism 322 is substantially parallel with the incident surface 316.

Further, a see-through mechanism associated with the display device in this embodiment will be explained in detail with reference to FIG. 18 together with the process of semitransparent film coating at the fourth internal reflecting surface 319. Referring to FIG. 18, the fourth internal reflecting surface 319 is formed of a half-mirror having an arbitrary reflectance rate (or a transmission rate) as mentioned above so as to have such a function that a part of the incident light rays from the real image display part 202 is reflected at this surface, and is then projected onto the viewing field of the observer by way of the light condensing member 400 while a part of light rays from the outside is transmitted through the optical prism 315.

Further, an external light introducing prism 324 is mounted on the fourth internal reflecting surface 319 of the optical prism 315 through the intermediary of the half mirror part (319). This external light introducing prism 324 is mounted so as to be joined to the optical prism 315 (with no gap therebetween). This external light introducing prism 324 is formed in a triangular columnar shape having side surfaces one of which is a planar surface in parallel with the light emanating surface 318. The planar surface parallel with the emanating surface 318 is formed therein with a recessed part 325. Light rays introduced from an external light introducing window 326 are introduced into the viewing field of the observer while the angle of the line of sight in the observing direction is held so as to cancel out the refractive power of the light condensing member 400.

By the way, since the half mirror part is mounted to the fourth internal reflecting surface 319, a certain loss in the quantity of light transmitted to the real image display part 202 is caused, which is contrary to such a fact a display image from the real image display part 202 should be brightly displayed. However, it is required for provision of a see-through mechanism for directly or indirectly observing surroundings upon monitoring by setting the eye closely adjacent to an eye piece (which is not shown and which corresponds to the display window 106 shown in FIG. 2), that is, it is required for enhancing the safety for the user and working efficiency which are important in the display device.

This see-through mechanism is advantageous since the visual isolation from surroundings can be prevented, and since it can readily cope with variation in the surroundings. Further, even though recognition of surroundings is required when the working mode is changed over and so forth, it is not required to shift the line of sight away from the display device at every occasion, and accordingly, it is convenient even in view of the working efficiency. Thus, there is provided the see-through mechanism including the half-mirror which is not completely reflective so as to transmit therethrough a part of light rays, and the external light introducing prism 324 at the fourth internal reflecting surface 319.

Next, explanation will be made of the structure and operation of the shutter part 327 using liquid crystal and mounted just before the external light introducing window 326 as shown in FIG. 18. The shutter part 327 is simply adapted for controlling the quantity of transmitting light, and accordingly, the shutter part 327 is closed in response to instructions from a control processor part 328 so as to completely shut off light from the outside. Thus, only light from a small-sized display module 14 is projected. With this arrangement, the observer can concentrate to an image form the small-sized display module 14.

In response to instructions from the control processor part 328, the display of the real image display part 202 os disappeared, and the shutter part 327 is opened so as to introduce light form the outside into the eyes in order to plainly show the situation of surroundings, Should the display of the real image display part 202 to be turned on in addition to the opening of the shutter part 327, two images would be introduced being overlapped with each other so as to cause invisibility. Accordingly, overlapping display is prevented in this mechanism. Further, as mentioned above, not only the liquid crystal shutter mechanism but also a mechanical shutter mechanism may be used for effecting the identical function.

A recessed part 325 or an optical correction means having a negative refractive power which has a function for canceling out the magnifying power of the light condensing member 400 is located directly after the external light introducing window 326 and the shutter part 327 as viewed from the viewing side so as to form a certain kind of an afocal optical system. With this arrangement, the situation of surroundings can be projected into the viewing field.

It is noted that although the light condensing member 400 is explained by using, for example, the spherical optical lens having a positive refractive power, as shown in FIG. 1, instead of the spherical lens, any one of an aspherical lens, a Fresnel lens and a hologram lens may be used.

(Eighth Embodiment)

Figure 19:
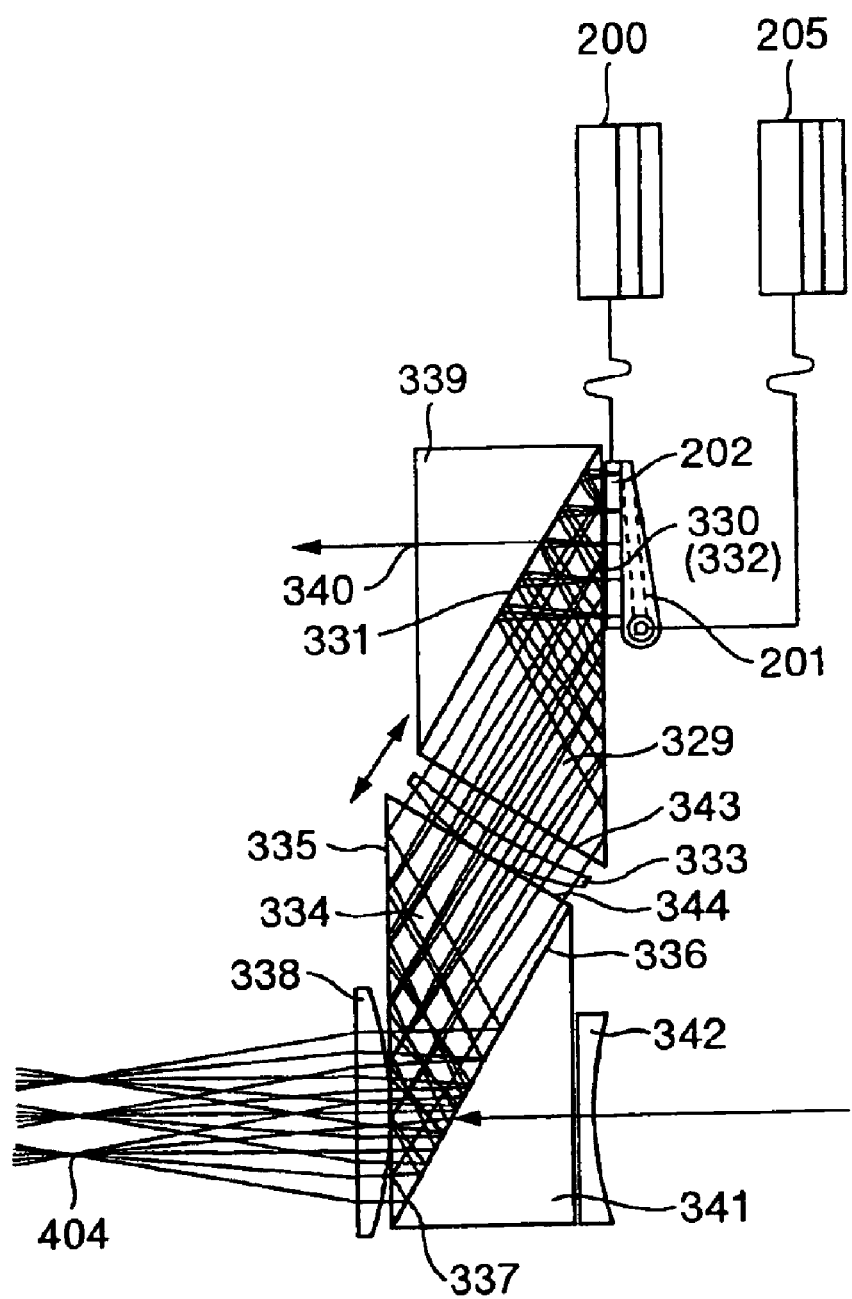
FIG. 19 is a view illustrating a configuration of a display apparatus in another embodiment of the present invention.

Referring to FIG. 19 which is a schematic view illustrating a display device in an eighth embodiment of the present invention, similar to the above-mentioned seventh embodiment, except such a feature that a new lens is added in the optical prism 315, in comparison with the above-mentioned embodiment 7, explanation will be made or an optical system and peripheral units thereof. Diffusion light emitted from the backlight device 201 passes through the real image display part 202 so as to create a bundle of light rays containing image data. The bundle of light rays is incident upon the first optical prism 329 through a part of the incident surface 330. The first optical prism 329 is formed in a triangular columnar shape having a substantially right-triangular section. A planar surface along a longer one fo two sides making a right angle therebetween, is a first internal reflecting surface 331 formed of a half mirror part made of metal or a dielectric multi-layer film as mentioned above. The bundle of light rays is reflected at the first internal reflecting surface 331 while the remainder of light rays is emanated outside of the first optical prism 329, and accordingly, a display image is directly projected into the viewing field, as mentioned above.

Further, the reflected bundle of light rays is reflected at the second internal reflecting surface 332 which corresponds to a slope side of the substantially triangular shape, and which is one and the same plane as that of the incident surface 330 and as well the inner surface of the incident surface 330. The reflection at the second internal reflecting surface 332 becomes total reflection ruled by the Snell's law. Accordingly, no film coating such as metal or a dielectric multi-layer film for enhancing, in particular, the reflectance rate, as mentioned above, is required, and further, no special process for enhancing the reflectance rate is applied, similar to the above-mentioned embodiment. The bundle of light rays reflected at the second internal reflecting surface 332 emanates from the first optical prism 329 through the emanating surface 343. The emanating surface 343 is a planar surface along a shorter one of the sides of the triangular columnar shape, which make a right angle therebetween.

The bundle of light rays emanating from the emanating surface 343 is incident upon an image magnifying part 333 so as to be converged while it is incident upon the second optical prism 334. The second optical prism 334 has such a configuration that the first optical prism 329 is arranged in rotational symmetry. Accordingly, the internal reflecting surface 334 constituting the second optical prism 334 corresponds to the emanating surface 343, and a third internal reflecting surface 335 corresponds to the incident surface 330 while a fourth internal reflecting surface 336 corresponds to the first internal reflecting surface 331.

Further, the bundle of light rays which has been incident upon the incident surface 344 is reflected at the third internal reflecting surface 335, and then reaches the fourth internal reflecting surface 336. Further, a part of the light rays is reflected by the fourth internal reflecting surface 336, and the remainder of the light rays are transmitted therethrough. The reflected light rays emanate from the second optical prism 334 through the emanating surface 337. The bundle of emanating light rays passes through an eyepiece lens 338 located just after the prism 334 and having a positive refractive power so as to project an image on the real image display part 202, in the form of a magnified virtual image, into the viewing field (eye point 404).

Further, the light rays transmitted through the first internal reflecting surface 331 without being reflected thereby contains image data from the real image display part 202, and accordingly, effective image data can be directly given to the observer by using a certain display method without being virtually magnified. Further, since the display is straight-forward, the position of the eyepoint 404 may have a sufficient distance without being limited by the eye-piece 338, thereby, a use method having a large freedom can be materialized and a mental uncomfortability due to eye touch can be eliminated.

Further, a liquid crystal or mechanical shutter (which is not shown, and refer to the shutter part 327 shown in FIG. 18) is provided at or in close vicinity to the first internal reflecting surface 331 so as to eliminate stray light caused during observation of a virtual image. Further, a correction prism 339 having a triangular columnar shape is provided, making contact with the first internal reflecting surface 331, and accordingly, a display image can be observed in front without being curved. The emanating surface 340 of the correction prism 339 is substantially parallel with the incident surface 330. The structure of this arrangement is similar to that of any of the above-mentioned embodiments.

Further, a see-through mechanism with which surroundings can be observed can be provided in the magnified virtual image observing part (eyepiece lens 338), similar to the above-mentioned embodiment. Accordingly, the correction prism 341, the refractive power correction lens 342 and the liquid crystal or mechanical shutter mechanism (which is not shown, and refer to the shutter part 327 shown in FIG. 18) may be provided.

Further, the two optical prisms (first and second optical prisms 329, 334) for efficiently and compactly transmitting light rays containing image data from the real image display part 202 are provided thereto with mechanisms (which are not shown) for moving them back and forth along the optical axis of the image magnifying part 333. Such moving mechanisms are well-known as can been seen in a zoom lens mechanism and are not essential in the present invention, and accordingly, explanation thereto will be omitted. The image magnifying part 333 is moved, independent from or together with the first optical prism 329 so as to materialize a focus adjusting mechanism for the observer with respect to the real image display part 202. Further, the image magnifying part 333 may be configured not only independent from but also with the incident surface 343 of the first optical prism 329 or the incident surface 344 of the second optical prism 334. In either case, the same technical effects and advantages can be obtained.

(Ninth Embodiment)

Figure 20:
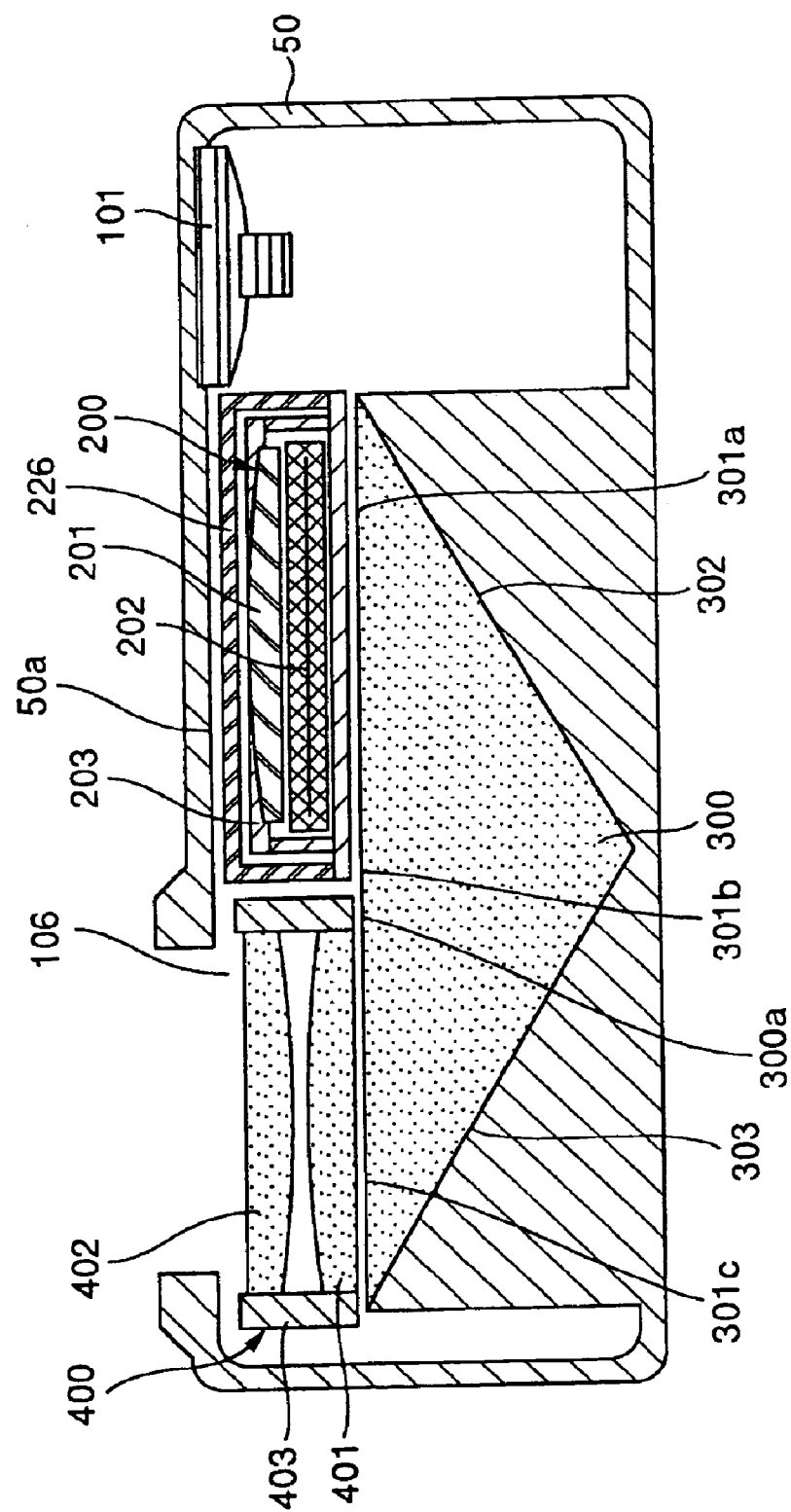
FIG. 20 is an enlarged sectional view illustrating a portable data terminal which is mounted thereon with a virtual image display apparatus in another embodiment of the present invention.

Next, consideration will be made of measures for solving a problem of heat generated in the image forming module 200 or the like. FIG. 20 is an enlarged sectional view illustrating a portable data terminal incorporating a virtual image display apparatus in another embodiment of the present invention, and illustrating parts around the light conductive member 300. In this embodiment, there is provided such a feature that a heat shielding member 226 is provided outside of the housing 203 for holding the backlight device 201 and the real image display part 202 so as to cover the housing 203, in contrast to FIG. 4.

Referring to FIG. 20, although the heat shielding member 226 may be made of the same material as that of the housing 203, it is preferably made of, in particular, resin materials since this material can efficiently restrain heat radiation and heat transmission. Of these resin materials, a foamed resin material or an organic material with which transmission of heat becomes slower, is more preferably used.

Further, the heat shielding member 226 is preferably provided so as to be restrained from being excessively projected from the light condensing member 400 toward a surface 50a of the housing 50 in order to aim at thinning the portable data terminal and the virtual image display apparatus. Specifically, a height difference is preferably set to be less than 20 mm so as to prevent the eyes of the user from excessively approaching the housing 50, and accordingly, the possibility of such an occasion that the observer feels heat with his face can be reduced.

Further, the heat shielding member 226, the backlight device 201, the real image display part 202, the housing 203 and the like have contact points which are small as possible as it can, and an air layer is interposed between the heat shielding member 226 and another member. With this arrangement, the transmission of heat can be reduced, and the blocking of the heat radiation may be efficiently made so as to be more preferable. Contact parts between the heat shielding member 226 and the housing 50 of the portable data terminal can be reduced as possible as it can so as to define an air layer therebtween, thereby it is possible to efficiently block heat.

With this arrangement, in the portable data terminal or the virtual image display apparatus, the image forming module 200 and the display window 106 which serve as a heat source, are both face one and the same surface 50a of the housing 50 and are arranged near to the same. Further, in such a situation that the eye relief is used in close vicinity thereof, by a distance of less than 100 mm, the temperature of the housing 50 in the vicinity of the display window 106 or the image forming module 200 can be restrained from rising. Thus, when the user peeps into the portable data terminal or the virtual image display apparatus, even though the user unexpectedly touch the housing 50 in the vicinity of the display window 106 or the image forming module 200, the user can be restrained from sensing uncomfortability (hot heat feeling), thereby it is possible to provide a portable data terminal which is convenient in use.

In particular, since the user directly peeps into the virtual image display apparatus or the portable data terminal, it is likely to make his face into contact with the housing 50. Different from the hands which are custom to bring hot things, the face is very sensitive to heat, and accordingly, the user feels uncomfortability even though the temperature of the housing is not so high so that the user can touch the housing by his hand. Further, the user would possibly astonished at such a moment that his face touches a hot part of the housing 50. In view of these points, it is desirable to lower the temperature of the surface of the housing 106 around at least the display window 50 to a degree with which the user does not feel hot heat. Specifically, it is preferably set to a value which is below 40 deg. C., and is more preferably set to a value lower than about 35 deg. C. which is lower than the human temperature.

With the arrangement shown in this embodiment, it is possible to minimize the temperature of the surface of the housing 50, even though the face or hands of the user touches the housing 50, and the user can restrain from feeling uncomfortability, and can be prevented from being astonished by hot heat. Further, radiation of heat to the eye point 404 can be minimized. Thereby it is possible to provide a portable data terminal which can carry out a comfortable work, and which is convenient in use. Further, with the provision of the heat shielding member 226 to the image forming module 200, transmission of heat to members other than the image forming module 200, provided in the portable data terminal, and the volume of heat radiation can be greatly reduced.

Specifically, the image forming module 200 is formed in such a way that a liquid crystal panel having a diagonal length of less than 2.54 cm (1 inch) is used in the real image display part 202 and a cold cathode tube is used as the backlight device 201. Further, the heat shielding member is made of asbestos, glass wool, thick color resin or the like which is nonsmokable or nonflammable and which has a heat transmission rate of 0.2 ($w.m^{-1}\cdot k^{-1}$)

The heat shielding member 226 is preferably made of a material having a light absorbing function since the material can absorb unnecessary stray light leaking from the image forming module 200 so as to restrain deterioration of the optical characteristics of the virtual image display apparatus, which is caused by the stray light. Further, by forming an anti-reflection film on the heat shielding member 226 on the side facing the image forming module 200, similar effects can be obtained. Further, if an anti-reflection film is formed on a material having a high light absorbance rate, it is possible to enhance the efficiency of prevention of stray light.

Further, concavities and convexities, that is, unevenness, are preferably formed on the outer surface of the heat shielding member 226 so as to enlarge the surface area thereof. With this arrangement, the cooling efficiency of the heat shielding member 226 itself which is likely to be hot by radiation of heat or heat transmission from the image forming module 200 can be enhanced, and accordingly, it is possible to minimize the temperature rise of the outer surface of the housing 50 of the portable data terminal.

The shape of the concavities and convexities may be fin-like, may be formed by grooving or simply increasing the surface roughness thereof (specifically greater than 10 $\mu$).

The surface of the heat shielding member 226 on which the concavities and convexities are formed may be on the image forming module 200 side, on the side remote from the latter or each of both sides. It is noted that they are formed on the surface remote from the image forming module 200 in view of the cooling efficiency.

Figure 21:
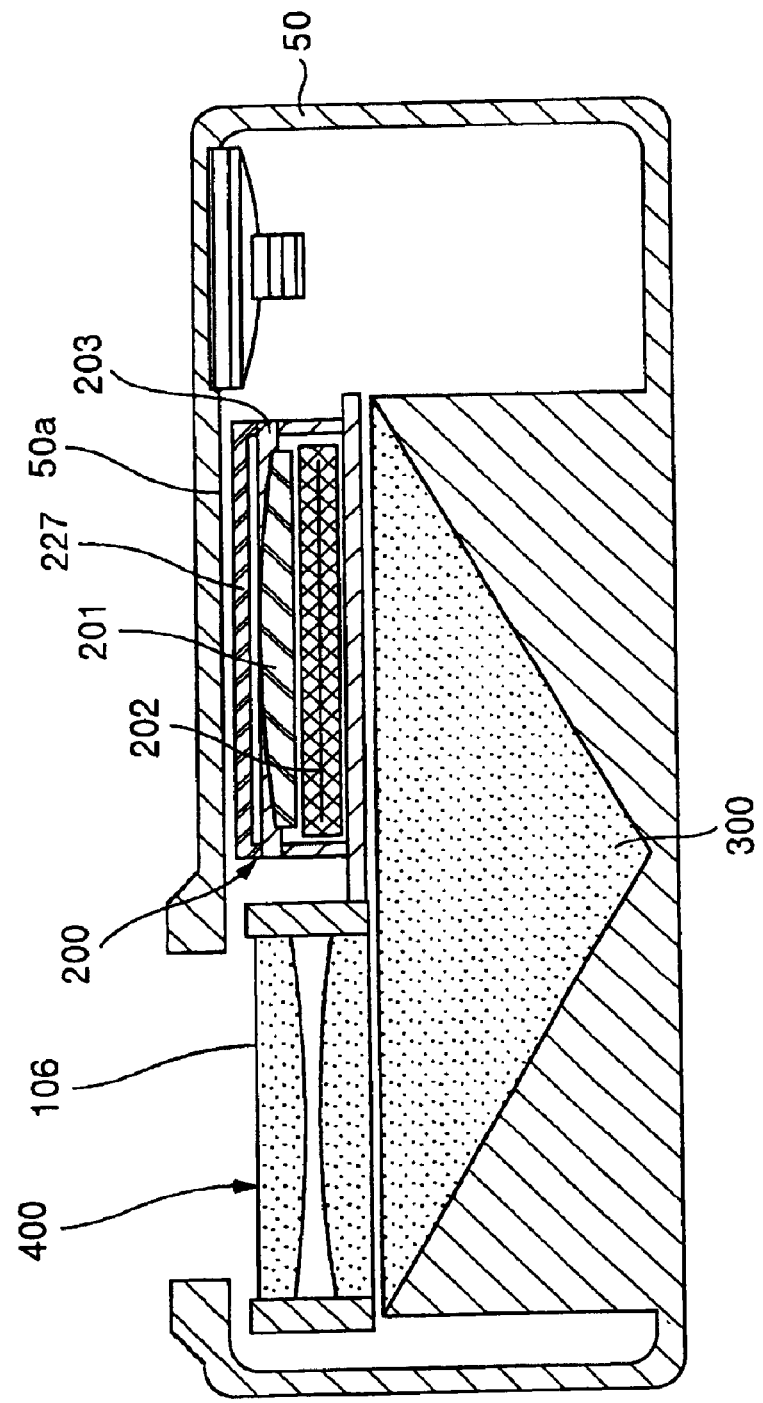
FIG. 21 is an enlarged sectional view illustrating a portable data terminal which is mounted thereon with a virtual image display apparatus in another embodiment of the present invention.
Figure 22:
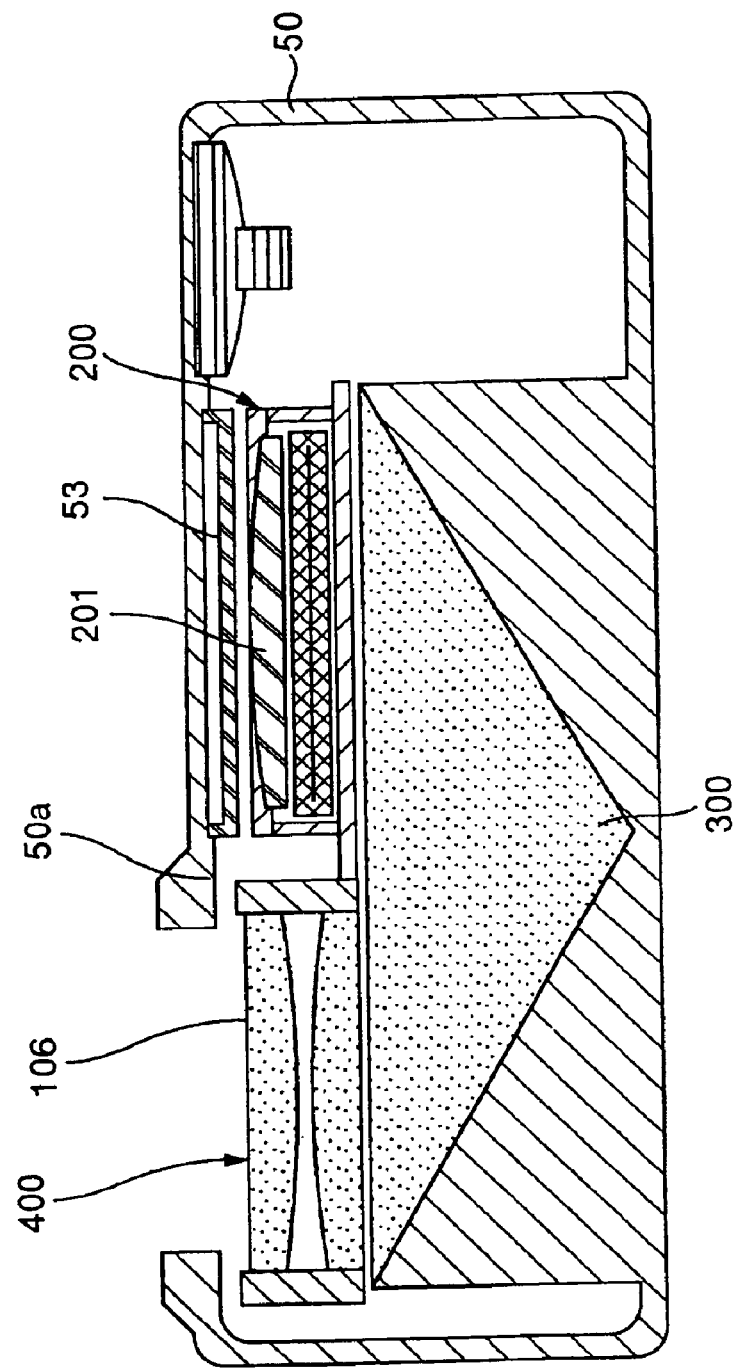
FIG. 22 is an enlarged sectional view illustrating a portable data terminal which is mounted thereon with a virtual image display apparatus in another embodiment of the present invention.
Figure 23:
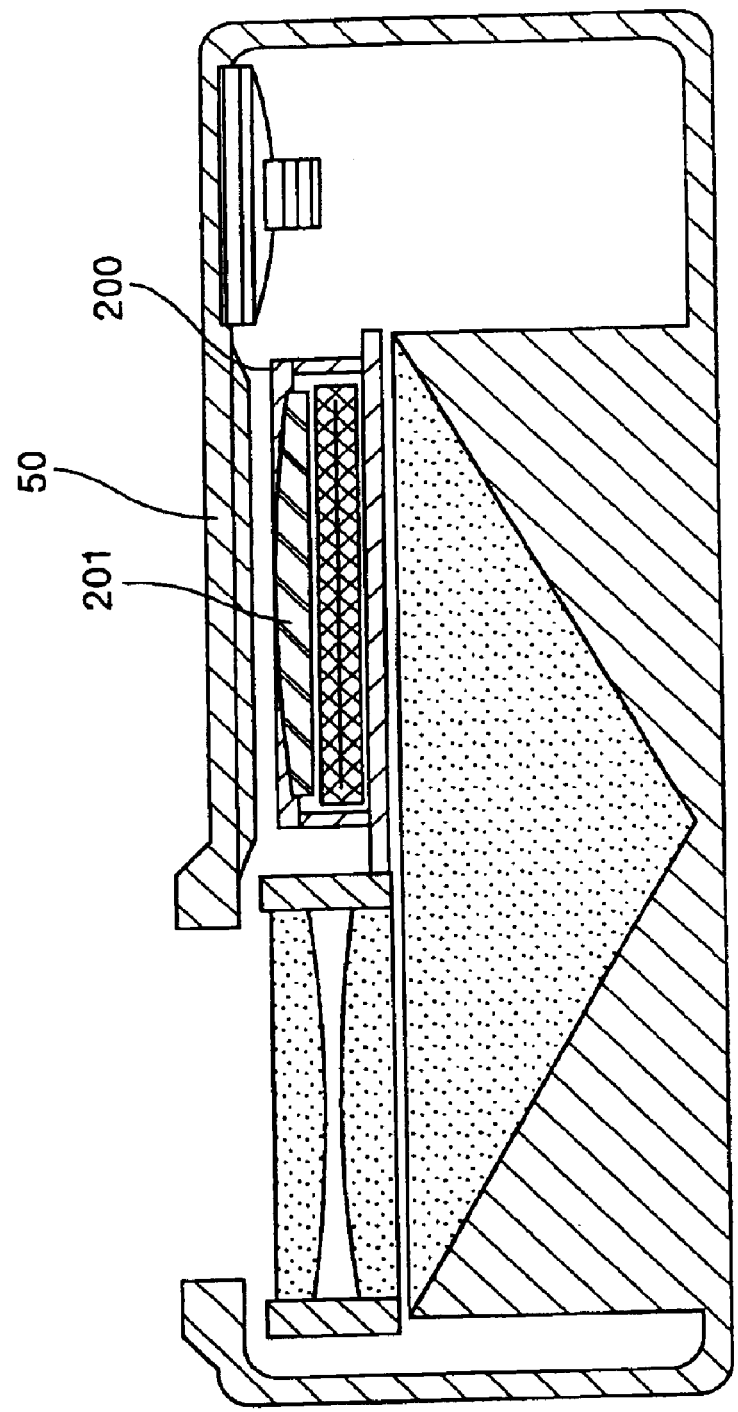
FIG. 23 is an enlarged sectional view illustrating a portable data terminal which is mounted thereon with a virtual image display apparatus in another embodiment of the present invention.

Instead of the heat shielding member 226 explained in this embodiment, arrangements shown in figures subsequent to FIG. 21 may be used. FIGS. 21 to 23 are enlarged sectional views illustrating portable data terminals in other embodiments of the present invention.

Referring to FIG. 21, a heat shielding member 207 which is different from the heat shielding member 226 as mentioned above, is fixed to the upper part (on the surface 50a side of the housing 50), and is adapted to block radiation of heat from a backlight device 201 or the upper part of a housing 203 which contribute to the rise of the temperature of the housing 50 by a highest degree, but the heat shielding member 207 does not cover the side surfaces of the housing 203 and the real image display 202. Even in this arrangement, the contact between the heat shielding member 207 and the housing 203 as well as the housing 50 is reduced as possible as it can so as to preferably define an air layer therebetween, similar to the above-mentioned embodiments.

Referring to FIG. 22, a heat shielding member 53 which is different from the heat shielding members 226, 227 is fixed to the housing 50 on the image forming module 200 side. Even in this condition, the contact area between the heat shielding member 53 and the housing 50 is deceased as possible as it can so as to preferably define an air layer between the heat shielding member 53 and the housing 203 as well as the housing 50. With this arrangement, it is possible to eliminate the necessity of provision of the position of installation of the heat shielding member on the virtual image display apparatus side, and accordingly, the freedom of the virtual image display apparatus can be enhanced.

Referring to FIG. 23, no special heat shielding member is provided, but instead thereof, the thickness of the surface 50a of the housing 50 on the image forming module 200 side is greater than that of the other part. Specifically, if the other part has an average thickness of about 1 to 2 mm, it has about 2.5 to 5 mm. Thereby it is possible to effectively block heat from the members of the image forming module 200. In this case, the backlight device 201 of the image forming module 200 or the housing 203 is spaced from the housing 50 as possible as it can so as to preferably define an air layer therebetween.

It is noted that although the heat shielding member (53, 226, 227) is provided being fixed to the housing 203 or the housing 50 in this embodiment, a heat shield member made of sponge or the liked may be interposed between the housing 50 or a housing 203 and the backlight device 201 without being positively fixed to the housing 50 or 226.

Further, even though a plane emission type image forming module is used without using the backlight device 203, the relationship between the one serving as a heat source and the housing 50 or the heat shielding member (53, 226, 227) can be considered to be similar to that of this embodiment.

(Tenth Embodiment)

Figure 24:
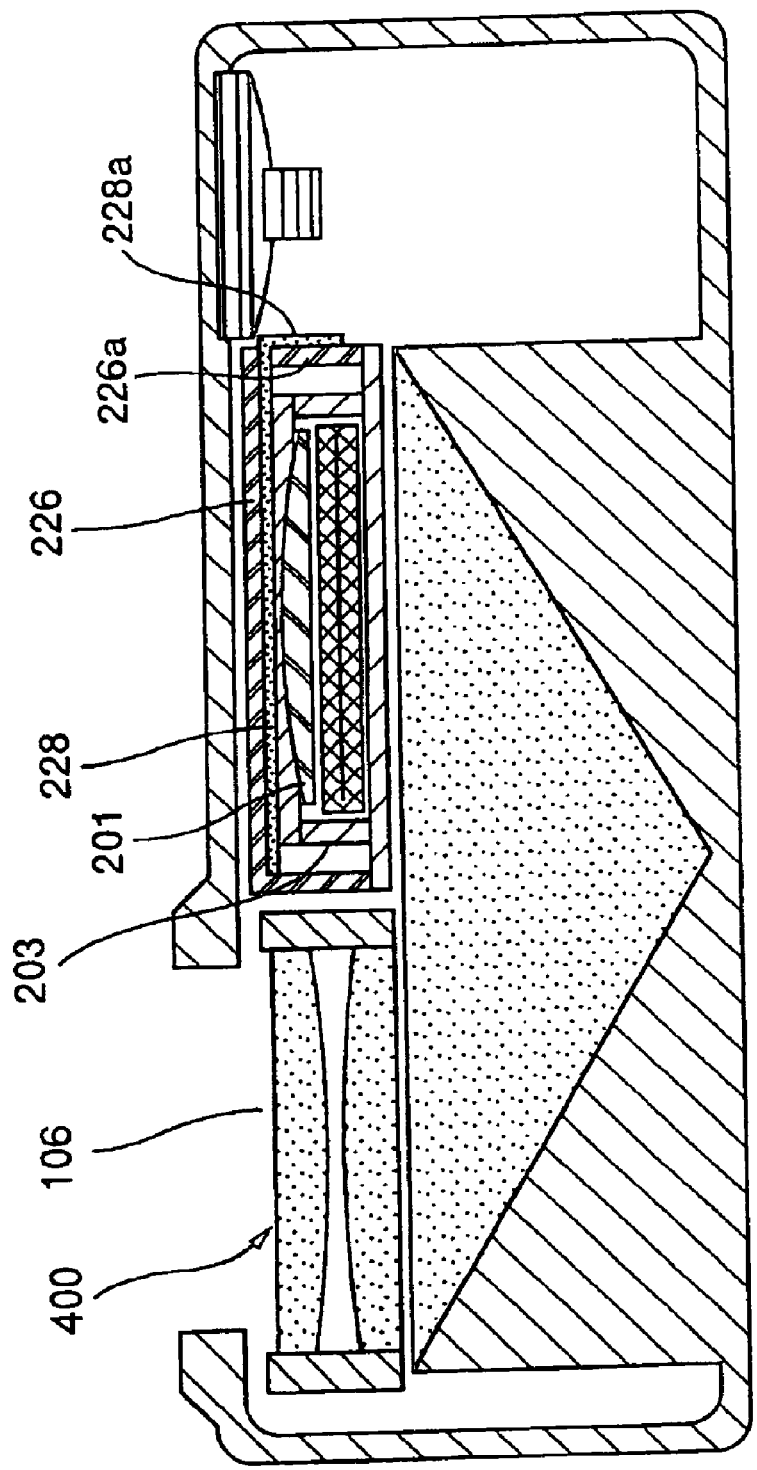
FIG. 24 is an enlarged sectional view illustrating a portable data terminal which is mounted thereon with a virtual image display apparatus in another embodiment of the present invention.

Referring to FIG. 24 which is an enlarged sectional view illustrating a portable data terminal incorporating a virtual image display apparatus in another embodiment of the present invention, the optical structure and function of the virtual image display device is identical with those explained above, and accordingly, detailed description to the optical part thereof will be omitted. Another measures for solving a problem of heat in the image forming module 200 will be explained.

This embodiment is similar to the above-mentioned ninth embodiment in view of such a fact that the heat shielding member 226 is provided outside of the housing 203 which holds the backlight device 201 incorporated in the image forming module 200 and the real image display part 202, so as to cover the housing 203. However, a hole part 226a which is communicated with the outside is formed in a part of a side surface of the heat shielding member 226, and a heat radiating panel 228 is made into contact with or is located adjacent to the backlight device 201 while preventing the real image display part 202 from being shielded. Further, a part of the heat radiating panel 228 is projected from the hole part 226a.

The heat radiating panel 228 is preferably made of a metal material since heat is readily radiated from the image forming module 200 so as to restrain temperature rise of the image forming module 200.

Further, within the housing 50 of the portable data terminal, the projecting part 228a of the heat radiation panel 228 is located on the side opposite to the side where the light condensing means 400 serving as an eye piece lens is provided. With this arrangement, heat generated from the image forming module 200 can hardly be transmitted toward the display window 106, and accordingly, the user can hardly feel hot heat when he uses the portable data terminal while heat can be efficiently radiated outside of the image forming module 200. It is possible to efficiently prevent occurrence of erroneous operation due to heat from the members in the image forming module 200, such as the backlight device 201 or the real image display part 202, and thereby it is possible to enhance the reliability of the virtual image display apparatus or the portable data terminal. Further, in particular, the projecting part 228a of the heat radiation panel 228 preferably has a concave and convex shape or a corrugated shape, or the outer surface thereof is preferably roughened so as to increase the surface area in order to enhance the heat radiating rate.

Figure 25:
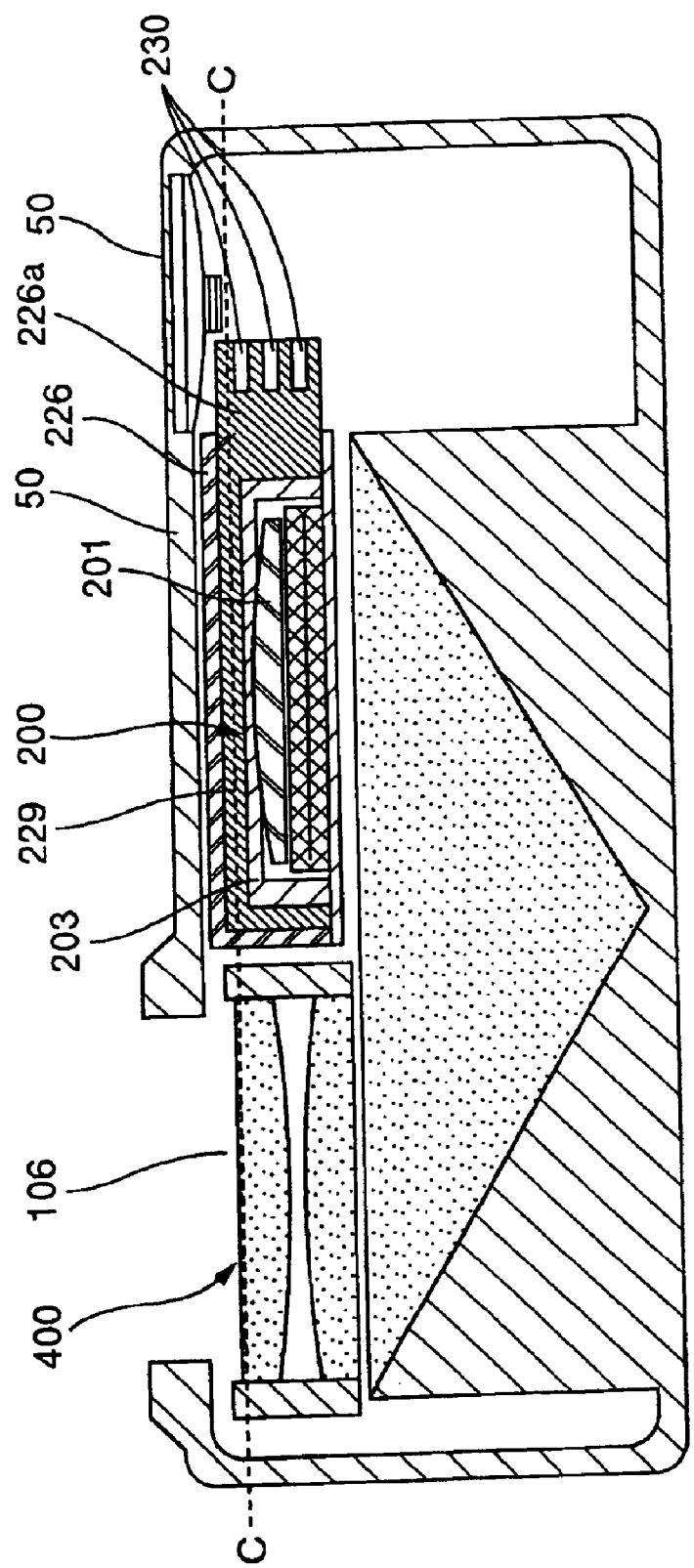
FIG. 25 is a partial sectional view illustrating a portable data terminal which is mounted thereon with a virtual image display apparatus in another embodiment of the present invention.

Further, referring to FIG. 25 which is a partly sectioned view illustrating a portable data terminal incorporating a virtual image display apparatus in another embodiment of the present invention, a heat sink part 229 for temporarily reserving radiation heat before heat radiation outside of the apparatus is provided between the image forming module 200 and the heat shielding member 226, and further, heat radiation fins 230 are formed in a side part of the heat sink part 229 so as to prevent the backlight device 201 and the real image display part 202 from being shielded. The heat sink part 229 and the heat radiation fins 230 are communicated with each other through the hole part 226a as mentioned above.

The heat radiation fins 230 are formed at a position which has a distance from the light condensing means 400 or the display window 106, as long as possible, and as in this embodiment, at least a part of the heat radiation fins 230 is preferably provided on the side remote from the display window 106, with the image forming module 200 being interposed therebetween. Thereby it is possible to restrain heat radiated from the heat radiation fins 230, from being transmitted toward the display window 106.

Figure 26:
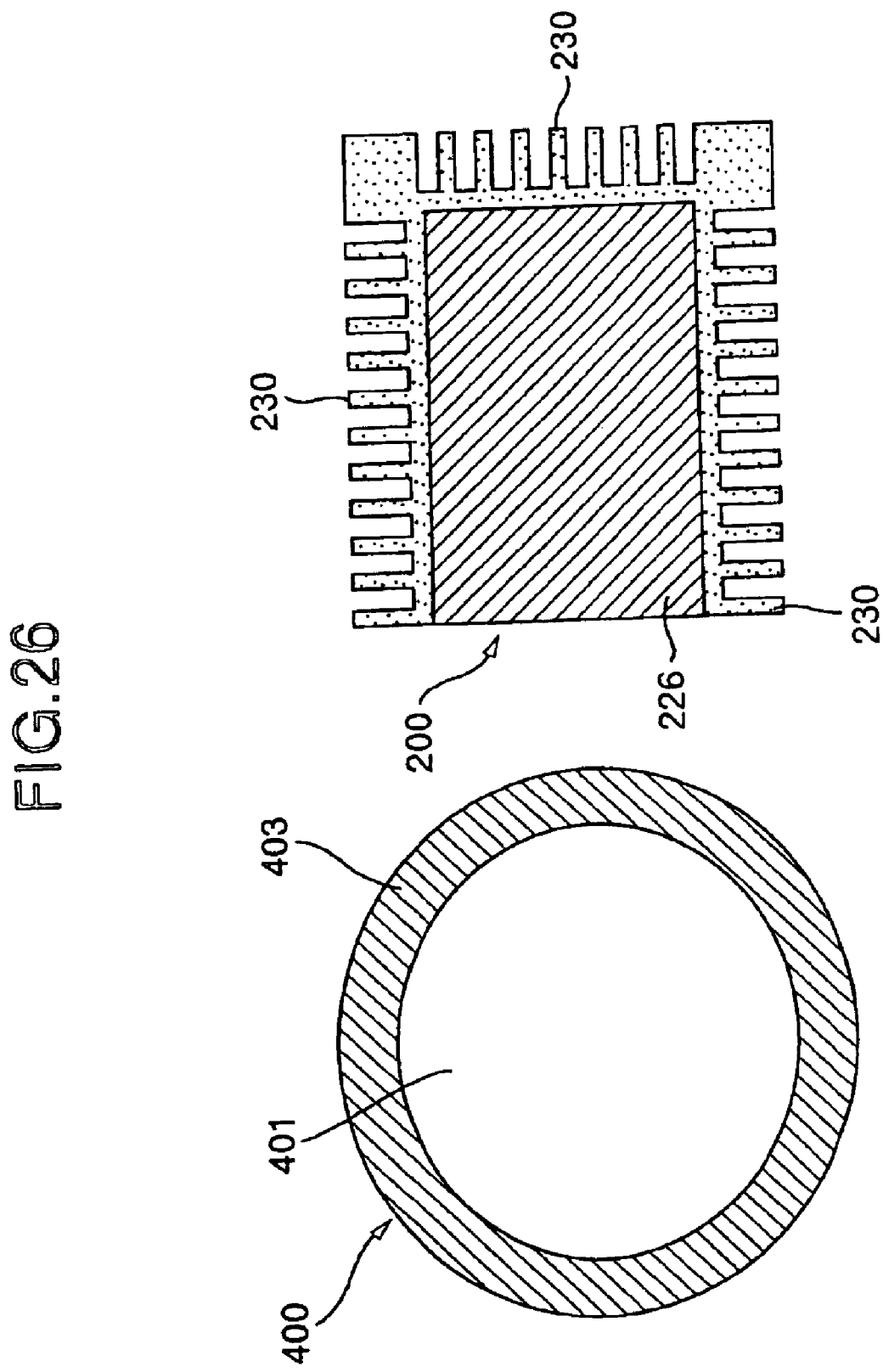
FIG. 26 is a sectional view illustrating line C–C' in FIG. 25.

Further, as shown FIG. 26 which is a sectional view along line C–C' in FIG. 25, heat radiation fins 230 are provided so as to surround the image forming module 200. With this arrangement, the heat radiation ability can be improved in comparison with such an arrangement that the heat radiations fins 210 are provided only on one side. Thereby it is possible to efficiently restrain temperature rise of the image forming module 200.

Further, no heat radiation fins 203 are provided on the light condensing means 400. With this arrangement, it is possible to efficiently prevent heat transmission from the heat radiation fins 230 to the light condensing means 400 or the display window 106 located thereabove, and accordingly, it is possible to restrain temperature rise of the periphery of the display window 106. Thus, the user is prevented from feeling hot heat so as to be uncomfortable, thereby it is possible to provide a portable data terminal which is convenient in use.

Further, the heat sink part 229 can be provided turning round the light guide means 300 in a direction perpendicular to the plane of FIG. 25, and if the heat value is high, it is further extended so as to be located in a space in the slop side part (the outside part of the first internal reflecting surface 302) of the light guide means 300. Thereby it is possible to substantially prevent the thickness of the virtual image display apparatus from being increased in the direction of the line of sight, thereby it is possible to compromise the thinning of the portable data terminal with the heat radiation ability thereof.

(Eleventh Embodiment)

Figure 27:
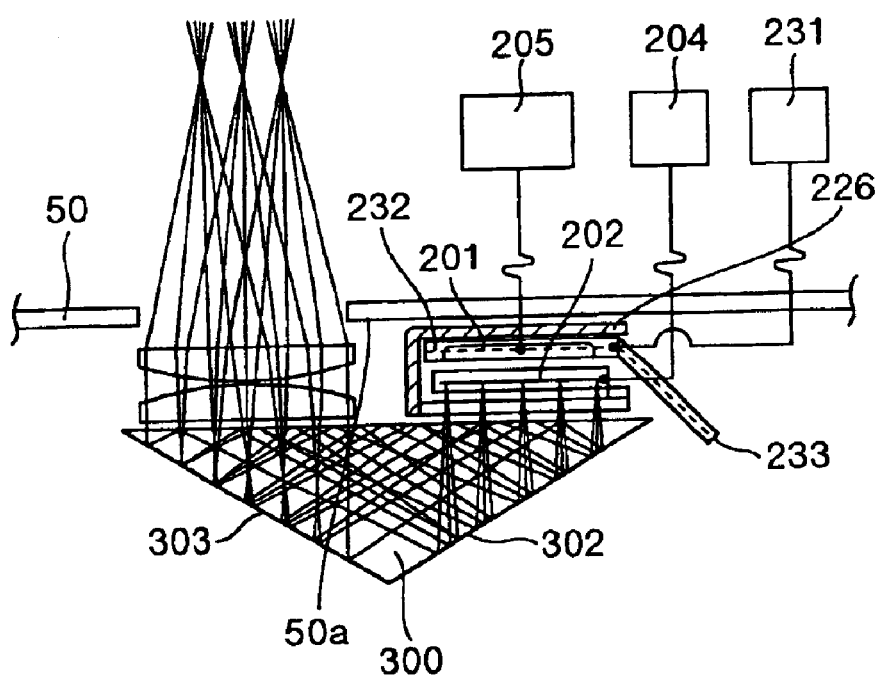
FIG. 27 is a partial sectional view illustrating a portable data terminal which is mounted thereon with a virtual image display apparatus in another embodiment of the present invention.
Figure 28:
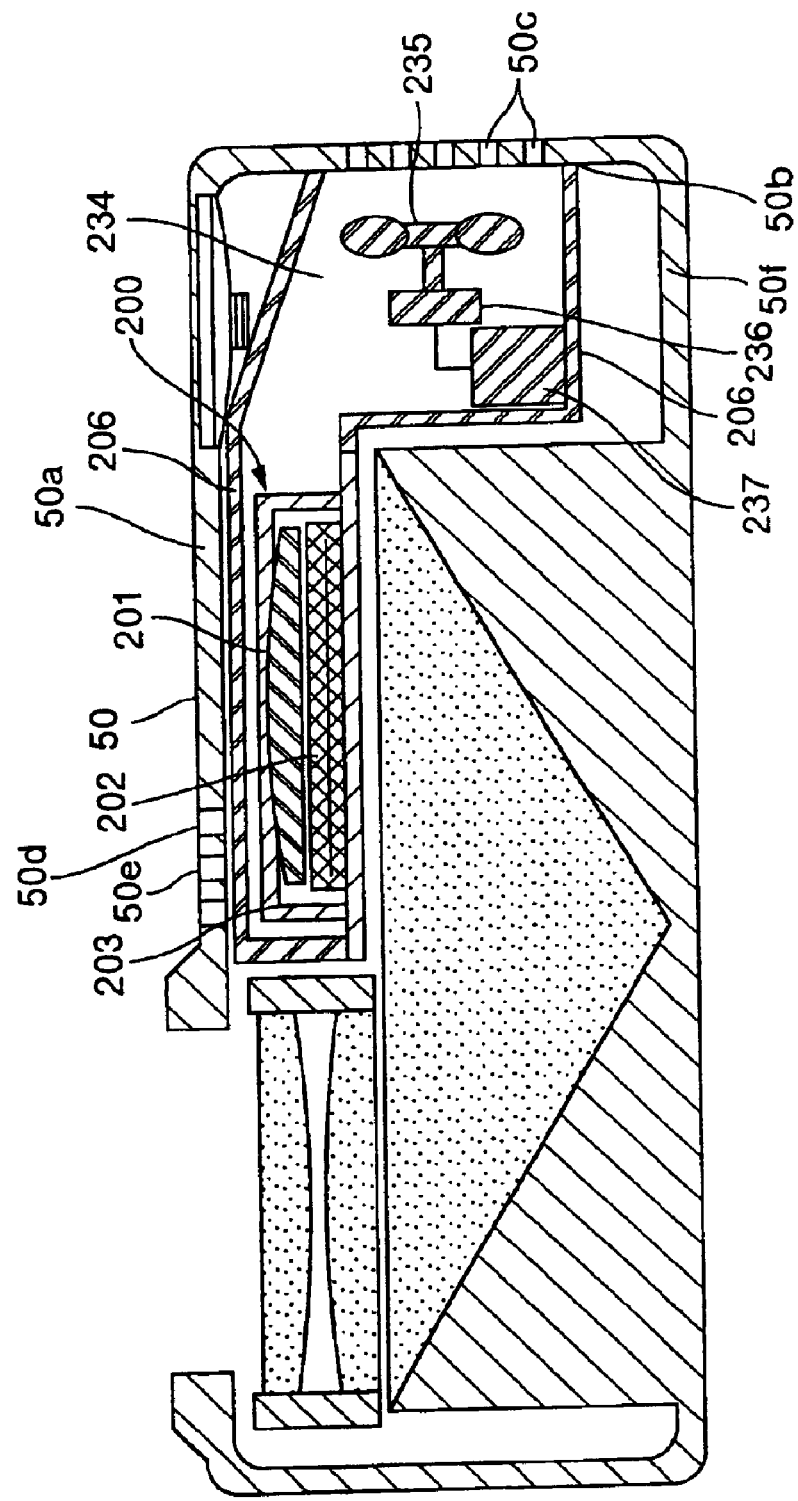
FIG. 28 is a partial sectional view illustrating a portable data terminal which is mounted thereon with a virtual image display apparatus in another embodiment of the present invention.

Referring to FIG. 27 which is a partly sectioned view illustrating a portable data terminal incorporating a virtual image display apparatus in another embodiment of the present invention, this embodiment is similar to the above-mentioned tenth embodiment in view of such a configuration that a heat shielding member 226 is provided outside of the housing 203 for holding the backlight device 201 and the real image display part 202 incorporated in the image forming module 200, so as to cover the housing 203, and a hole part 226 communicated with the outside is formed in a side surface of the heat shielding member 226. Thus, duplication of the explanation thereto will be omitted.

Referring FIG. 27, there are shown a Peltier element drive means 231, and a Peltier element 232 which is arranged adjacent to or joined to the backlight device 201 (the image forming module 200) so as to serve to forcibly cool the backlight device 201, and which is operated by the Peltier element drive means 231. The operation of the Peltier element 232 by the Peltier element drive means 231 is preferably intermittent. Thus, the power consumption of the Peltier element 232 can be reduced while temperature rise of the backlight device 201 (the image forming module 200) is restrained. The capacity of a battery for the portable data terminal can be held for a long time.

A heat radiation panel 233 is located adjacent to or joined to the Peltier element 232 so as to prevent light emanating from the backlight device 201 and the real image display part 202 and directed to the light guide member 200, from being blocked, and further, a part of the heat radiation panel 233 is projected through the hole part 226a The projecting direction of the heat radiation panel is set to extend away from the surface 50a of the housing 50 which faces the image forming module 200 or the light condensing member 400. With this arrangement, a heat source affecting the temperature of the surface of the housing of the portable terminal can be located far from the side where the face of the user possibly touches, and accordingly, the temperature rise of the housing can be restrained. Thus, even though the user uses the portable data terminal with his eyes being located near to the portable data terminal, the portable data terminal can be comfortably used.

(Twelfth Embodiment)

Referring to FIG. 23 which is a partly sectioned view illustrating a portable data terminal incorporating a virtual image display apparatus in another embodiment of the present invention, this embodiment is similar to the tenth embodiment in view of such a configuration that a heat shield member 226 is provided outside of the housing 203 for holding the backlight device 201 and the real image display part 202 incorporated in the image forming module 200, so as to cover the housing 203. Thus, explanation thereto will be omitted.

In this embodiment, the heat shielding member 226 not only covers the image forming module 200 but also extends to the surface 50b of the housing 50 so as to define a closed space 234 in cooperation with the surface 50b. The closed space 234 is provided therein with a cooling fan 235, a motor 236 for driving the cooling fan 235 and a control means 237 for controlling the operation of the motor 236, in addition to the image forming module 200. Further, a slit 50c for ventilation is formed in the surface 50b of the housing 50 which is surrounded by the heat shielding member 226. During the operation of the image forming module 200, the motor control device 237 drives the motor 236 so as to rotate the cooling fan 235.

Further, the air around the image forming module 200, heated by the image forming module 200 is discharged outside from the portable data terminal through the slit 50c due to the rotation of the cooling fan 235. It is preferable to form an opening in addition to the slit 50c, in the housing 50 of the portable data terminal in order to enhance the discharge efficiency of warmed air by the cooling fan 235. Further, a slit 50e serving as the opening is more preferably formed in a surface 50d opposite to the surface 50b of the housing 50.

Thus, in the virtual image display apparatus or the portable data terminal in which the display window 106 and the image forming module 200 are arranged being adjacent to each other, the slit 50e is formed in the housing 50 at a position which is nearer to the display window 106 than to the image forming module 200 while the cooling fan 235 is arranged at a position which is nearer to the image forming module serving as a heat source than to the display window 106, and a slit 50c is formed near to the cooling fan 235 so as to create air flow from the cooling fan 235 to the slit 50c while causing air to flow from the slit 50e to the slit 50c. Thus, the air heated by the image forming module 200 is retrained from being directed to the display window 106, thereby it is possible to restrain the air heated by the image forming module 200, from impinging upon the user who peeps into the virtual image display apparatus from the display window 106. Thus, it is possible to provide a portable data terminal which can substantially prevent the user from feeling uncomfortability and which is convenient in use.

Further, since fresh air introduced through the slit 50e can be led around the image forming module 200, being carried by the air flow, the cooling efficiency of the image forming module 200 can be also enhanced. It is noted that although the slit 50c is formed in the surface 50b of the housing 50 while the cooling fan 235 is faced toward the surface 50b in this embodiment, the slit 50c may be formed in the surface 50f of the housing 50 while the cooling fan 235 may be faced to the surface 50f.

What is claimed is:

1. A virtual image display apparatus comprising a real image display part for displaying an image, an image magnifying means for optically magnifying the image displayed in the real image display part so as to form a virtual image, and a light guide means for guiding light from the real image display part to the image magnifying means, said light guide means being formed in a triangular columnar shape having a substantially isosceles triangular cross-section, and having: (1) a first surface serving as a light incident surface, a light emanating surface, and a reflective surface, (2) a second surface serving as a first internal reflecting surface, and (3) a third surface serving as a second internal reflecting surface, wherein:

emanating light from the real image display part is incident upon and enters the light guide means through the first surface, the entering light is successively internally reflected by: (1) the first internal reflecting surface, (2) the reflective surface of the first surface, and (3) the second internal reflecting surface, and the successively reflected light emanates from the light guide means through the emanating surface of the first surface and enters into the image magnifying means.

2. A virtual image display apparatus comprising a real image display part for displaying an image, an image magnifying means for optically magnifying the image displayed in the real image display part so as to form a virtual image, and a light guide means for guiding light from the real image display part to the image magnifying means, the light guide means being formed in a quadrate columnar shape having a substantially parallelogram sectional shape and having: (1) both a first internal reflecting surface and a fourth internal reflecting surface for reflecting light into the light guide means, (2) a second internal reflecting surface serving as both a light incident surface and a reflecting surface, and (3) a third internal reflecting surface serving as both a light emanating surface and a reflecting surface, wherein:

emanating light from the real image display part is incident upon the light guide means through the second internal reflecting surface, the incident light is successively reflected at the first internal reflecting surface, the second internal reflecting surface, the third internal reflecting surface, and the fourth internal reflecting surface, and the successively reflected light emanates from the third internal reflecting surface and enters into the image magnifying means.

3. A virtual image display apparatus as set forth in claim 1 or 2, wherein an optical distance between the real image display part and the image magnifying means is changed.

4. A virtual image displaying apparatus as set forth in claim 1 or 2, wherein an optical distance between the real image display part and the image magnifying means is changed, and the image magnifying means can be tilted with respect to the emanating light axis of the light guide means.

5. A virtual image displaying apparatus as set forth in claim 1 or 2, wherein there is provided a light shielding means for covering at least a part of the real image display part.

6. A virtual image displaying apparatus as set forth in claim 1 or 2, wherein there is provided a heat shielding means for covering at least a part of the real image display part.

7. An electronic equipment comprising:
a transducing means for transducing at least one of a data signal and a voice signal into a transmission signal or transducing a receiving signal into at least one of a data signal and a voice signal,
an antenna for transmitting the transmission signal and receiving the receiving signal,
a speaker for transducing the received voice signal transduced by the transducing means into voice,
a microphone for transducing an audio voice signal into the transmission voice signal, and
a virtual image display apparatus as set forth in claim 1 or 2.

8. An electronic equipment comprising:
a transducing means for transducing at least either one of a data signal and a voice signal into a transmission signal or transducing a received signal into at least one of a data signal and a voice signal,
an antenna for transmitting the transmission signal or receiving the received signal,
a speaker for transducing the received voice signal transduced by the transducing means into a voice audio signal,
a microphone for transducing an audio voice signal into the transmission voice signal,
the virtual image display apparatus of claim 1 or 2 for displaying the received data signal transduced by the transducing means,
a control means for controlling several elements including one or more of the transducing means, the speaker, the virtual image display apparatus, and the microphone, and
a display means different from the virtual image display apparatus.

9. A virtual image display apparatus as set forth in claim 1, wherein the emanating light from the real image display part is incident upon and enters the light guide means through the first surface and is internally reflected by the first internal reflecting surface, then by the reflective surface of the first surface and finally by the second internal reflecting surface, and thereafter, the entering light emanates from the light guide means through the first surface and is incident upon the image magnifying means.

10. A virtual image display apparatus comprising a real image display part for displaying an image, an image magnifying means for optically magnifying the image displayed in the real image display part so as to form a virtual image, and a light guide means for guiding light from the real image display part to the image magnifying means,
said light guide means being formed in a triangular columnar shape having a substantially isosceles triangular cross-section, and having: (1) a first surface serving as a light incident surface, a light emanating surface, and a reflective surface, (2) a second surface serving as a first internal reflecting surface, and (3) a third surface serving as a second internal reflecting surface, wherein:
emanating light from the real image display part is incident upon and enters the light guide means through the first surface,
the entering light is successively internally reflected by: (1) the first internal reflecting surface, (2) the reflective surface of the first surface, and (3) the second internal reflecting surface,
the successively reflected light emanates from the light guide means through the light emanating surface of the first surface and enters into the image magnifying means,
a spatial operating distance is less than about 100 mm, and
an optical path length extending from the center of the real image display part to an eye point is larger than a value which is three times as large as the thickness of the light guide means.

11. A virtual image display apparatus comprising a real image display part for displaying an image, an image magnifying means for optically magnifying the image displayed in the real image display part so as to form a virtual image, and a light guide means for guiding light from the real image display part to the image magnifying means,
the light guide means being formed in a quadrate columnar shape having a substantially parallelogram sectional shape and having: (1) both a first internal reflecting surface and a fourth internal reflecting surface for reflecting light into the light guide means, (2) a second internal reflecting surface serving as both a light incident surface and a reflecting surface, and (3) a third internal reflecting surface serving as both a light emanating surface and a reflecting surface, wherein:
emanating light from the real image display part is incident upon and enters the light guide means through the second internal reflecting surface,
the entering light is successively reflected at the first internal reflecting surface, the second internal reflecting surface, the third internal reflecting surface, and the fourth internal reflecting surface,
the successively reflected light emanates from the third internal reflecting surface into the image magnifying means,
a spatial operating distance is less than about 100 mm, and
an optical path length extending from the center of the real image display part to an eye point is larger than a value which is three times as large as the thickness of the light guide means.

12. A virtual image display apparatus comprising a real image display part for displaying an image, an image magnifying means for optically magnifying the image displayed in the real image display part so as to form a virtual image, and a light guide means for guiding light from the real image display part to the image magnifying means, said light guide means comprising a first prism, a second prism and a second image magnifying means interposed between the first prism and the second prism, said first prism being formed in a triangular columnar shape having a right triangle cross section and having: (1) a long side used as a first internal reflecting surface, (2) a short side used as an emanating surface, and (3) a slope side used as both an incident surface and a second internal reflecting surface, said second prism being formed in a triangular columnar shape having: (1) a long side used as a fourth internal reflecting surface, (2) a short side used as an incident surface, and (3) a slope side used as both an emanating surface and a third internal reflecting surface, emanating light from the real image display part is incident upon and enters the incident surface of the first prism, the light entering the first prism is successively reflected at the first internal reflecting surface and the second internal reflecting surface, the successively reflected light within the first prism emanates from the emanating surface of the first prism, the light emanating from the first prism is incident upon and enters the second prism by way of the second image magnifying means, the light entering the second prism is successively reflected at the third internal reflecting surface and the fourth internal reflecting surface, and the successively reflected light within the second prism emanates from the emanating surface of the second prism and enters into the image magnifying means.

13. A virtual image display apparatus as set forth in claim 11 or 12, wherein:

said fourth internal reflecting surface forms a half mirror, a correction prism formed in a right triangle-like columnar shape is provided outside of the fourth internal reflecting surface, and a light shielding means, is provided to the correction prism, for controlling light transmitting through the half mirror so as to be transmitted and blocked.

14. A virtual image display apparatus as set forth in any one of claims 10 to 12, wherein an optical distance between the real image display part and the image magnifying means is variable.

15. A virtual image display apparatus as set forth in any one of claims 10 to 12, wherein:

an optical distance between the real image display part and the image magnifying means is variable, and the optical axis of the image magnifying means is tiltable with respect to the emanating optical axis of the light guide means.

16. A virtual image display apparatus as set forth in any one of claims 10 to 12, wherein there is provided a light shielding means for covering at least a part of the real image display part.

17. A virtual display apparatus as set forth in any one of claims 10 to 12, wherein there is provided a heat shielding means for covering at least a part of the real image display part.

18. A virtual image display apparatus as set forth in claim 10, wherein said first surface is formed as a total reflection surface based upon the Snell's law.

19. A virtual image display apparatus as set forth in claim 11 or 12 wherein the second internal reflecting surface and the third internal reflecting surface are formed as total reflecting surfaces based upon the Snell's law.

20. A virtual image display apparatus as set forth in any one of claims 10 to 12, wherein said image magnifying means is an optical member provided adjacent to the surface from which the light emanates from the light guide means in a noncontact manner and has a positive refractive power.

21. A virtual image display apparatus as set forth in any one of claims 10 to 12, wherein a space is defined between the real image display part and the light guide means.

22. A virtual image display apparatus as set forth in any one of claims 10 to 12, wherein a light shielding means is provided a part of the surface of the light guide means.

23. A virtual image display apparatus as set forth in claim any one of claims 10 to 12, wherein there is provided a support member for supporting the light guide means and the support member has a light absolving ability.

24. A virtual image display apparatus as set forth in claim 10, wherein the emanating light from the real image display part is incident upon and enters the light guide means through the first surface and is internally reflected by the first internal reflecting surface, then by the reflective surface of the first surface and finally by the second internal reflecting surface, and thereafter, the entering light emanates from the light guide means through the first surface and is incident upon the image magnifying means.

25. An electronic equipment comprising:

a transducing means for transducing at least one of a data signal and a voice signal into a transmission signal or transducing a receiving signal into at least one of a data signal and a voice signal, an antenna for transmitting the transmission signal and receiving the receiving signal, a speaker for transducing the received voice signal transduced by the transducing means into an audio voice signal, a microphone for transducing an audio voice signal into the transmission voice signal, a virtual image display apparatus as set forth in any one of claims 10 to 12, and a control means for controlling one or more of the transducing means, the antenna, the speaker, the microphone, and the virtual image display apparatus.

26. An electronic equipment comprising:

a transducing means for transducing at least either one of a data signal and a voice signal into a transmission signal or transducing a received signal into at least one of a data signal and a voice signal, an antenna for transmitting the transmission signal or receiving the received signal, a speaker for transducing the received voice signal transduced by the transducing means into a voice audio signal, a microphone for transducing an audio voice signal into the transmission voice signal, the virtual image display apparatus of any one of claims 14 to 16 for displaying the received data signal transduced by the transducing means, a control means for controlling several elements including one or more of the transducing means, the speaker, the virtual image display apparatus, and the microphone, and a display means different from the virtual image display apparatus.

* * * * *